United States Patent [19]

Matsuzaki et al.

[11] Patent Number: 5,966,514
[45] Date of Patent: Oct. 12, 1999

[54] MICROPROCESSOR FOR SUPPORTING REDUCTION OF PROGRAM CODES IN SIZE

[75] Inventors: Toshimichi Matsuzaki, Minoh; Masashi Deguchi, Nara; Toshifumi Hamaguchi, Takatsuki; Yutaka Tanase, Tsuzuki-gun; Masahiko Matsumoto, Nagaokakyo, all of Japan

[73] Assignee: Matsushita Electric Industrial Co., Ltd., Osaka, Japan

[21] Appl. No.: 08/643,947

[22] Filed: May 7, 1996

[30] Foreign Application Priority Data

May 31, 1995 [JP] Japan ................................ 7-133281
May 31, 1995 [JP] Japan ................................ 7-134078

[51] Int. Cl.$^6$ ...................................................... G06F 9/00
[52] U.S. Cl. .......................... 395/386; 395/380; 395/381; 395/384; 395/387; 395/401; 395/427
[58] Field of Search ................................. 395/380, 381, 395/384, 386, 387, 389, 390, 401, 427, 421.04

[56] References Cited

U.S. PATENT DOCUMENTS

| | | |
|---|---|---|
| 4,245,304 | 1/1981 | Porter et al. . |
| 5,043,868 | 8/1991 | Kitamura et al. . |
| 5,101,483 | 3/1992 | Tanagawa ................................ 395/380 |
| 5,249,273 | 9/1993 | Yoshitaka et al. ....................... 395/380 |
| 5,274,776 | 12/1993 | Senta ...................................... 395/380 |
| 5,301,285 | 4/1994 | Hanawa et al. .......................... 395/380 |
| 5,390,358 | 2/1995 | Sugino . |
| 5,428,786 | 6/1995 | Sites . |
| 5,440,701 | 8/1995 | Matsuzaki et al. ...................... 395/381 |
| 5,452,423 | 9/1995 | Picard et al. ............................ 395/381 |
| 5,542,058 | 7/1996 | Brown, III et al. ..................... 395/380 |
| 5,590,358 | 12/1996 | Mizrahi-Shalom et al. ............ 395/800 |

FOREIGN PATENT DOCUMENTS

| | | |
|---|---|---|
| 0184806 | 6/1986 | European Pat. Off. .......... G06F 9/44 |
| 499853 | 8/1992 | European Pat. Off. . |
| 5587367 | 7/1980 | Japan . |
| 5508503 | 11/1993 | Japan . |

*Primary Examiner*—Zarni Maung
*Assistant Examiner*—Saleh Najjar
*Attorney, Agent, or Firm*—Price Gess & Ubell

[57] ABSTRACT

A microprocessor is provided for supporting reduction of codes in size, wherein instructions are extended in units of 0.5 word from a basic one word code. A word of instruction, fetched from an external memory, is transferred to a decoding register via instruction buffers and a selector both operate in units of half words, then is decoded by a decoder. A storage unit stores a state of an instruction stored in an instruction buffer. A controlling unit controls the selector so that the instructions are transferred from instruction buffers to the decoding register in units of half words based on a direction from the decoder and the states stored in the storage unit.

9 Claims, 23 Drawing Sheets

"add #4,d 0"

←—operation code—→←-immediate value—→
(8bits)                (8bits)

indicates a code is stored.

format 1 format 2

☐ indicates a basic instruction word.   ▨ indicates an extension word.

Fig. 7A
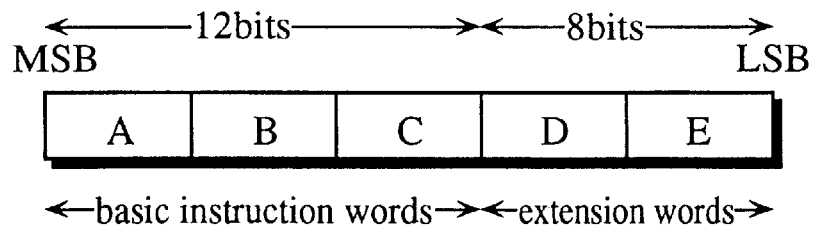
Fig. 7B
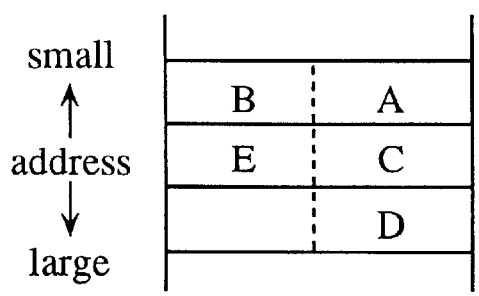
Fig. 7C
| clock cycle | 1 | | 2 | | 3 | | 4 | |
|---|---|---|---|---|---|---|---|---|
| IFB | B | A | E | C | — | D | — | D |
| IB | — | — | B | A | E | C | E | — |
| IR | — | — | — | — | A | B | B | C |
| state | — | | S2 | | S2 | | S1 | |

| clock cycle | 1 | | 2 | | 3 | | 4 | |
|---|---|---|---|---|---|---|---|---|
| IFB | A | — | C | B | D | E | — | — |
| IB | — | — | A | — | C | — | D | E |
| IR | — | — | — | — | A | B | B | C |
| state | — | | S1 | | S1 | | S2 | |

"jmp(abs16)"

before interrupt processing during interrupt processing

ST Dn, (PA)    specifies OAB50 for target memory address
ST Dn, (PA1)   specifies OAB51 for target memory address
ST Dn, (PA2)   specifies OAB52 for target memory address
ST Dn, (PA3)   specifies OAB53 for target memory address
ST Dn, (PA4)   specifies OAB54 for target memory address before interrupt processing during interrupt processing OABW : control signal for transferring data from ALB to OAB 50
OABSFT : signal for shifting data stored in OABs 50 to 54
OABSEL : signal for specifying any of OABs 50 to 54
address bus

MICROPROCESSOR FOR SUPPORTING REDUCTION OF PROGRAM CODES IN SIZE

BACKGROUND OF THE INVENTION (1) Field of the Invention

This invention relates to a microprocessor that processes data according to directions in a program, specifically to a microprocessor for supporting reduction of program codes in size.

(2) Description of the Prior Art

In these days, high-performances are expected for new microprocessor-embedded products. In order to realize such high-performance products, the programs of the microprocessors grow larger and larger. However, in the microprocessor-embedded products, the program should be stored in one or more ROMs. As a result, if the codes used in the programs increase in size, the capacity of a ROM and/or the number of ROMs should also increase, which is an obstacle in developing low-cost products. Therefore, it is desired to compress the code size as much as possible when such products are developed.

<First Conventional Technique>

One conventional technique for compressing the code size compresses the code size of each instruction executed by the microprocessor (e.g. NEC's V800 series and Hitachi's SH7000 series). The microprocessors of this technique execute instructions whose size is smaller than that of a data bus, Arithmetic Logic Unit (ALU), or registers (hereinafter ALU size). For example, the microprocessors execute 16-bit instructions while the ALU size is 32 bits.

The technique enables the replacement of a 32-bit instruction by a 16-bit instruction, thereby excluding unnecessary bits and efficiently compressing the total code size for a program.

However, this First Conventional Technique has a problem as described below.

Although the instruction size is smaller than the ALU size, the instruction size should be equal to or n times as large as the size of the instruction decoder of the microprocessor (n is integer). That is, an instruction is extended in units of 8 bits. For example, if the decoder is 8 bits in size, the instruction size should be any of 8, 16, 24, 32, . . . bits. The unit for the extension cannot be reduced to below 8 bits. As a result, even if 8 bits are not required for representing a value, 8 bits must be used. This creates a waste in the size of program codes due to the required use of unnecessary bits.

FIG. 1 shows a format of an instruction used in a conventional microprocessor. The instruction, "add #4, d0," instructs the microprocessor to add immediate value "4" to a value stored in register d0. The instruction uses 16 bits in total including 8 bits for specifying operation code "add #n,d0" and 8 bits for the immediate value "#n" which is "4" in this case. However, 8 bits are more than required to represent the value "4." An integer ranging from "–8" to "+7" requires only 4 bits. That means, 16 bits are used for the instruction which requires only 12 bits. This creates a waste in the size of program codes due to the required use of necessary bits.

<Second Conventional Technique>

A second Conventional Technique for compressing the code size is a method for effectively reading/writing data from/into a memory. This is achieved, e.g., by improving an addressing mode used in a data transfer instruction.

Both of FIGS. 2A and 2B are programs by which data is read/written from/into a memory. Both instruct the microprocessor to read a value stored in a memory, compute with the value, and store the computation result in the memory.

Instruction a1 in FIG. 2A is a load instruction by which a value stored in a location in a memory specified by an absolute address is read into register D0. Instruction a2 is an add instruction by which a value stored in register D1 is added to a value in register D0, then the result value is stored in register D0. Instruction a3 is a store instruction by which a value stored in register D0 is stored in a location in a memory specified by an absolute address. The basic part of these instructions has a length of 8 bits. An absolute address has a length of 16 bits. Accordingly, the total code size of the FIG. 2A program is 7 bytes. That means, 7 bytes are used for a set of data reading and writing from/into the memory.

In the FIG. 2A program, a 16-bit absolute address is used for each of two memory accesses. In the FIG. 2B program, an address register is used for memory accesses.

The program in FIG. 2B differs from that in FIG. 2A in that first it transfers an absolute address of the memory to an address register (instruction b1), secondly it transfers data from the memory to register D0 by specifying the address register (instruction b2), and thirdly it stores the computation result in the memory by specifying the address register (instruction b4).

Although the FIG. 2B program additionally includes an instruction for transferring an absolute address to an address register, only instruction b2 includes an absolute address. As a result, the total code size is reduced by one byte compared with the FIG. 2A program.

A large amount of program space can be reduced in a microprocessor if the code size for a set of memory accesses is reduced.

However, a problem of the Second Conventional Technique is that address registers are occupied when they are used for specifying absolute addresses of a memory. Therefore, a processor having fewer address registers may not always be able to use this method. Also, since a microprocessor, specifically a built-in microprocessor, frequently reads/writes data from/into a memory, address registers may not be used for other operations.

SUMMARY OF THE INVENTION

It is therefore a first object of the present invention to provide a microprocessor which executes instructions reduced effectively by liberating the instructions from a limitation that the instruction size should be equal to or n times as large as the size of the instruction decoder of the microprocessor (n is integer), thereby enabling the production of a program having codes with less size than conventional programs with the same contents.

It is a second object of this invention to provide a microprocessor which enables the reduction of the code size without occupying address registers.

The first object is fulfilled by a microprocessor for supporting reduction of codes in size, comprising: a decoder for decoding instructions which are "w" in length represented by expression w=a+nb, wherein "a" represents a maximum length of code at each decoding by the decoder, "n" an integer of 0 or larger, and "b" a positive integer smaller than "a," wherein an instruction is divided into one or more codes, and wherein the instructions include at least an instruction which is "a" in length and an instruction which is "(a+b)" in length; and an executing means for processing data based on information obtained from the instructions decoded by the decoding means.

This microprocessor extends instructions without a limitation that the instruction size should be equal to or n times as large as the size of the instruction decoder of the microprocessor (n is integer). That is, the microprocessor extends instructions in units of "b" which is smaller than "a." As a result, the present invention decreases unnecessary bits included in codes for instructions, reducing a total program size.

In the above microprocessor, "a" may equal to a word in length, and "b" may equal to a half word in length, wherein the word and the half word are units of length.

This microprocessor extends instructions in units of half words. Then, instruction length "w" will be any of a, 1.5a, 2a, 2.5a, 3a, . . . . When this happens, the amount of information specified by an instruction increases with less bits. For example, instructions can be defined with more information and data can be specified with more information.

The microprocessor may further comprise: an instruction buffer for holding a prefetched instruction; a storage means for storing information of a state of the instruction held in the instruction buffer for each half word; a first judging means for judging whether a code to be decoded next is a half word or a word in length based on information obtained from an instruction decoded by the decoding means; and a controlling means for controlling the instruction buffer based on the length judged by the first judging means and the state stored in the storage means so that a code of the instruction stored in the instruction buffer is transferred to the decoder and for updating the state stored in the instruction buffer.

This microprocessor stores a prefetched instruction in the instruction buffer, and stores information of the state of the prefetched instruction in the storage means for each half word and updates the information. Furthermore, the microprocessor judges whether the next code is a word or a half word in length. This enables the microprocessor to judge how the next code is aligned in the instruction buffer in units of half words.

The decoder of the microprocessor may comprise: an upper-order decoding register for storing an upper-order half word of a code; and a lower-order decoding register for storing a lower-order half word of the code; wherein the instruction buffer comprises: a first register for storing a word code fetched latest; a second register for storing a word code which precedes the code stored in the first register; and a selecting means for selectively transferring a code to the decoder based on a direction from the controlling means; wherein the first register comprises: a first upper-order register for storing an upper-order half word of a code; and a first lower-order register for storing a lower-order half word of the code; wherein the second register comprises: a second upper-order register for storing an upper-order half word of a code; and a second lower-order register for storing a lower-order half word of the code; wherein the selecting means comprises: an upper-order selecting means for selectively transferring a code to the upper-order decoding register from any of the second upper-order register, the second lower-order register, and the lower-order decoding register; and a lower-order selecting means for selectively transferring a code to the lower-order decoding register from any of the second upper-order register, the second lower-order register, and the first lower-order register; and wherein the storage means stores any of a first state which indicates that any of the second upper-order register and the second lower-order register does not store a code, a second state which indicates that the second upper-order register stores a code and the second lower-order register does not store a code, and a third state which indicates that each of the second upper-order register and the second lower-order register store a code.

This microprocessor fetches 1-word codes and stores them in the instruction buffer after dividing them into half word codes. A selected code is transferred to the decoding register independently in units of half words. The storage means stores the state of a code, which is to be transferred to the decoding register at next cycle, of how the code is aligned in the instruction buffer. This enables the microprocessor to store necessary codes in the instruction buffer and independently transfer them to the decoding register in units of half codes to decode them.

The controlling means of the microprocessor may control the selecting means so that the upper-order selecting means transfers a code from the second upper-order register to the upper-order decoding register, and that the lower-order selecting means transfers a code from the first lower-order register to the lower-order decoding register, if the storage means stores the second state and the first judging means judges that a next code to be decoded is a word in length.

The microprocessor transfers a 1-word code stored in over two registers to the decoding register to decode it. This enables the microprocessor to correctly decode and execute a 1-word code stored in over two locations in the external memory specified by two addresses, and liberates the microprocessor from a limitation by word alignment in aligning codes in the external memory.

The controlling means of the microprocessor may control the selecting means so that the upper-order selecting means transfers a code from the lower-order decoding register to the upper-order decoding register, and that the lower-order selecting means transfers a code from the second lower-order register to the lower-order decoding register, if the storage means stores the third state and the first judging means judges that a next code to be decoded is a half word in length, and updates the information stored in the storage means from the third state to the second state.

The microprocessor transfers only a half-word code from the second lower-order register to the decoding register, and decodes it with another half-word code decoded previously and executes both. This enables the microprocessor to correctly decode and execute a half word code even if the half word code is stored in a lower-order position in the external memory.

The controlling means of the microprocessor may control the selecting means so that the upper-order selecting means transfers a code from the lower-order decoding register to the upper-order decoding register, and that the lower-order selecting means transfers a code from the second upper-order register to the lower-order decoding register, if the storage means stores the second state and the first judging means judges that a next code to be decoded is a half word in length, and updates the information stored in the storage means from the second state to the third state.

The microprocessor transfers only a half-word code from the second upper-order register to the decoding register, and decodes it with another half-word code decoded previously and executes both. This enables the microprocessor to correctly decode and execute a half word code even if the half word code is stored in a upper-order position in the external memory.

The microprocessor may further comprise: a second judging means for judging whether an instruction decoded by the decoder is a jump subroutine instruction which is stored in a location in an external memory ending at a half word position based on the information stored in the storage means and information obtained from the decoded instruction, wherein if the second judging means judges that an instruction decoded by the decoder is a jump subroutine instruction which is stored in a location in an external memory ending at a half word position, the executing means executes a subroutine after specifying a return address of the subroutine which is obtained by adding a half word to the half word position.

With such a construction, even if a jump subroutine instruction is stored in a location in the external memory starting from a half-word boundary, the jump subroutine instruction is executed normally by saving a return address having the same length as that for a jump subroutine instruction ending at a word boundary. As a result, the number of accesses to the stack is reduced and unnecessary use of the stack is prevented. This improves the throughput of the microprocessor.

The second object of the present invention is fulfilled by a microprocessor for supporting reduction of codes in size, comprising: an operand address buffer for holding a target memory access address, wherein the operand address buffer is connected to an external memory; a fetching means for fetching an instruction; an instruction detecting means for detecting an instruction which has been fetched by the fetching means and is to access the external memory; a judging means for judging whether the instruction detected by the instruction detecting means specifies the target memory access address stored in the operand address buffer; a first controlling means for controlling the operand address buffer so that the address stored in the operand address buffer is output to the external memory if the judging means judges that the instruction detected by the instruction detecting means specifies the target memory access address; and a second controlling means for storing an address obtained from an operand of the instruction detected by instruction detecting means into the operand address buffer and controlling the operand address buffer so that the stored address is output to the external memory if the judging means judges that the instruction does not specify the target memory access address stored in the operand address buffer.

This microprocessor can access a memory without specifying any absolute addresses and without using address registers since an address stored in an operand address buffer is output to the memory if the address is specified as a target memory access address.

Also, even if there are lots of I/O accesses to I/O ports in memory mapped I/O as in built-in microprocessors, the address registers are not occupied. As a result, the microprocessor can use address registers efficiently.

Furthermore, when a same I/O port is monitored at every certain period and a value of the I/O port is repeatedly loaded, or when peripheral devices are controlled through an I/O port and a value of the I/O port is overwritten at every certain period, address registers are used efficiently by specifying an address stored in the operand address buffer as a target memory access address.

The increased use efficiency of the address registers helps the microprocessor to largely reduce the code size since absolute addresses are less transferred to address registers, data is less saved/restored from/to address registers, and address registers can be used for a variety of other purposes.

The microprocessor not only succeeds in reducing the code size, but succeeds in speeding up the execution time. This is because the number of address computations is reduced since an address stored in an operand address buffer is output to the memory if the address is specified as a target memory access address, accordingly the number of data transfers to ALU is reduced and computed addresses are less transferred to the operand address buffer.

The second object of the present invention is also fulfilled by a microprocessor for supporting reduction of codes in size, comprising: a buffer array for including n operand address buffers which respectively store from a previous target memory access address to a target memory access n times previously, wherein n is an integer of 2 or larger, and wherein the buffer array is connected to an external memory; a fetching means for fetching an instruction; an instruction detecting means for detecting an instruction which has been fetched by the fetching means and is to access the external memory; a judging means for judging whether the instruction detected by the instruction detecting means specifies any of the operand address buffers; a first controlling means for controlling the buffer array so that an address stored in an operand address buffer is output to the external memory if the judging means judges that the instruction detected by the instruction detecting means specifies the operand address buffer; and a second controlling means for storing an address obtained from an operand of the instruction detected by instruction detecting means into any of the operand address buffers and controlling the buffer array so that the stored address is output to the external memory if the judging means judges that the instruction does not specify any operand address buffers.

With such a construction, the microprocessor can output a target memory access address from any of n operand address buffers by selecting any of previous target memory access addresses stored in them. Thus, the microprocessor can access a memory without specifying any absolute addresses and without using address registers since an address stored in an operand address buffer is output to the memory as a target memory access address.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 7A shows the format of a 5-nibble instruction.

FIG. 7B shows how 1-nibble codes of the instruction shown in FIG. 7A are aligned when the instruction is stored in a location in the external memory starting from a byte boundary.

FIG. 7C shows the instruction pipeline at each clock cycle when the instruction shown in FIG. 7A is read by instruction decoding block 100.

DESCRIPTION OF THE PREFERRED EMBODIMENT

Preferred embodiments of the present invention are presented below with reference to figures.

First Embodiment (a) Construction

Figure 3:
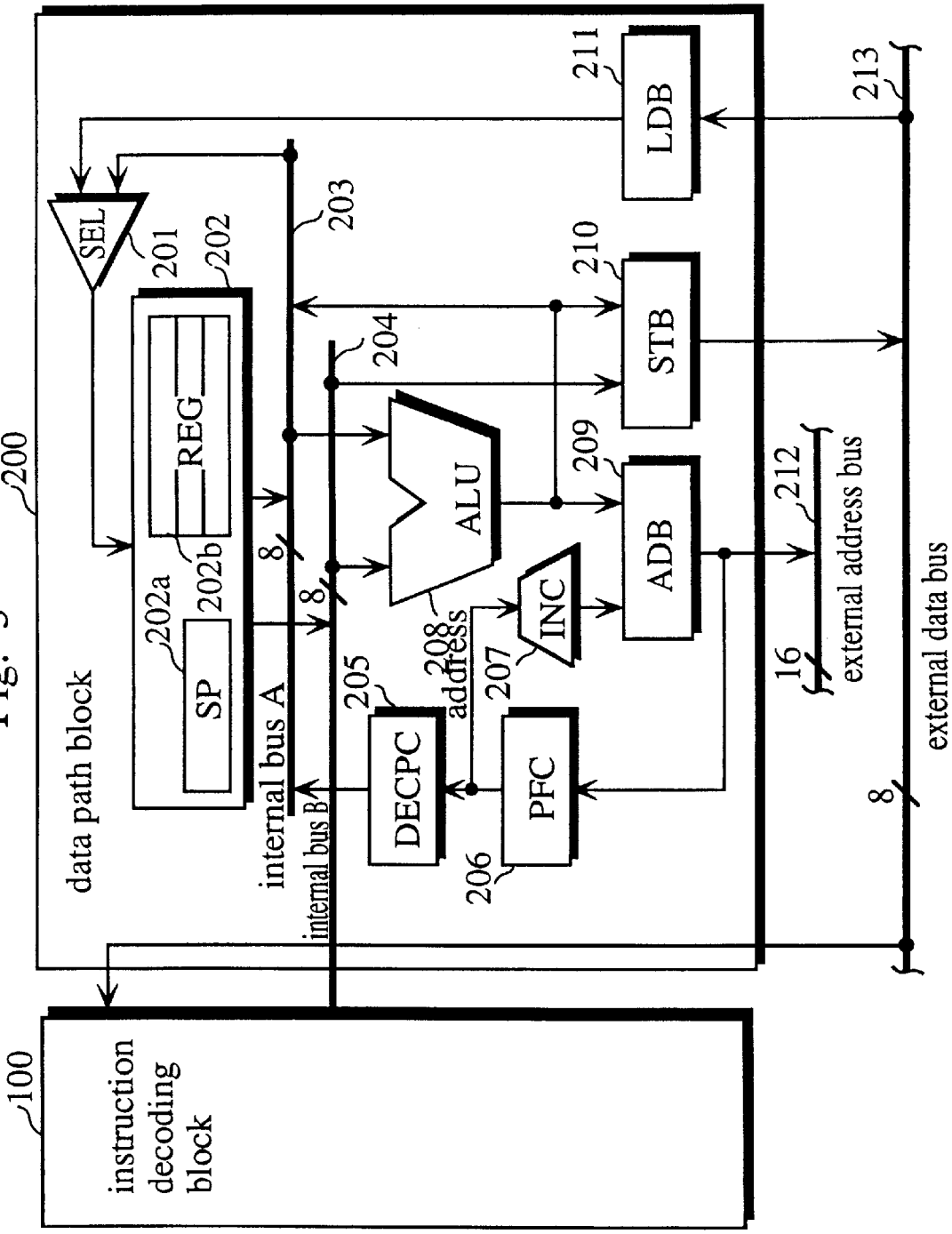
FIG. 3 is a block diagram showing a construction of a microprocessor of First Embodiment of the present invention.

FIG. 3 is a block diagram showing a construction of a microprocessor of First Embodiment of the present invention. The microprocessor, comprising a 16-bit external address bus 212 and an 8-bit external data bus 213, is divided into data path block 200 and instruction decoding block 100. Note that an external memory for storing instructions to be executed is not shown in the figure, but is connected to the processor via the above buses.

Data path block 200 for transferring data or performing computations comprises selector (SEL) 201, register group 202, internal bus A 203, internal bus B 204, decoding counter (DECPC) 205, pre-fetching counter (PFC) 206, incrementer (INC) 207, arithmetic logic unit (ALU) 208, address buffer (ADB) 209, store-data buffer (STB) 210, and load-data buffer (LDB) 211, characters in the parentheses presenting abbreviation. These components have general performances.

Each of stack pointer (SP) 202a, decoding counter (DECPC) 205, pre-fetching counter (PFC) 206, incrementer (INC) 207, and address buffer (ADB) 209 making up a unit for holding address information has 16 bits in size. On the other hand, each of general-purpose register (REG) 202b, store-data buffer (STB) 210, and load-data buffer (LDB) 211 making up a unit for holding data information has 8 bits in size. Data path block 200 and instruction decoding block 100 are connected by internal bus B 204.

Figure 4:
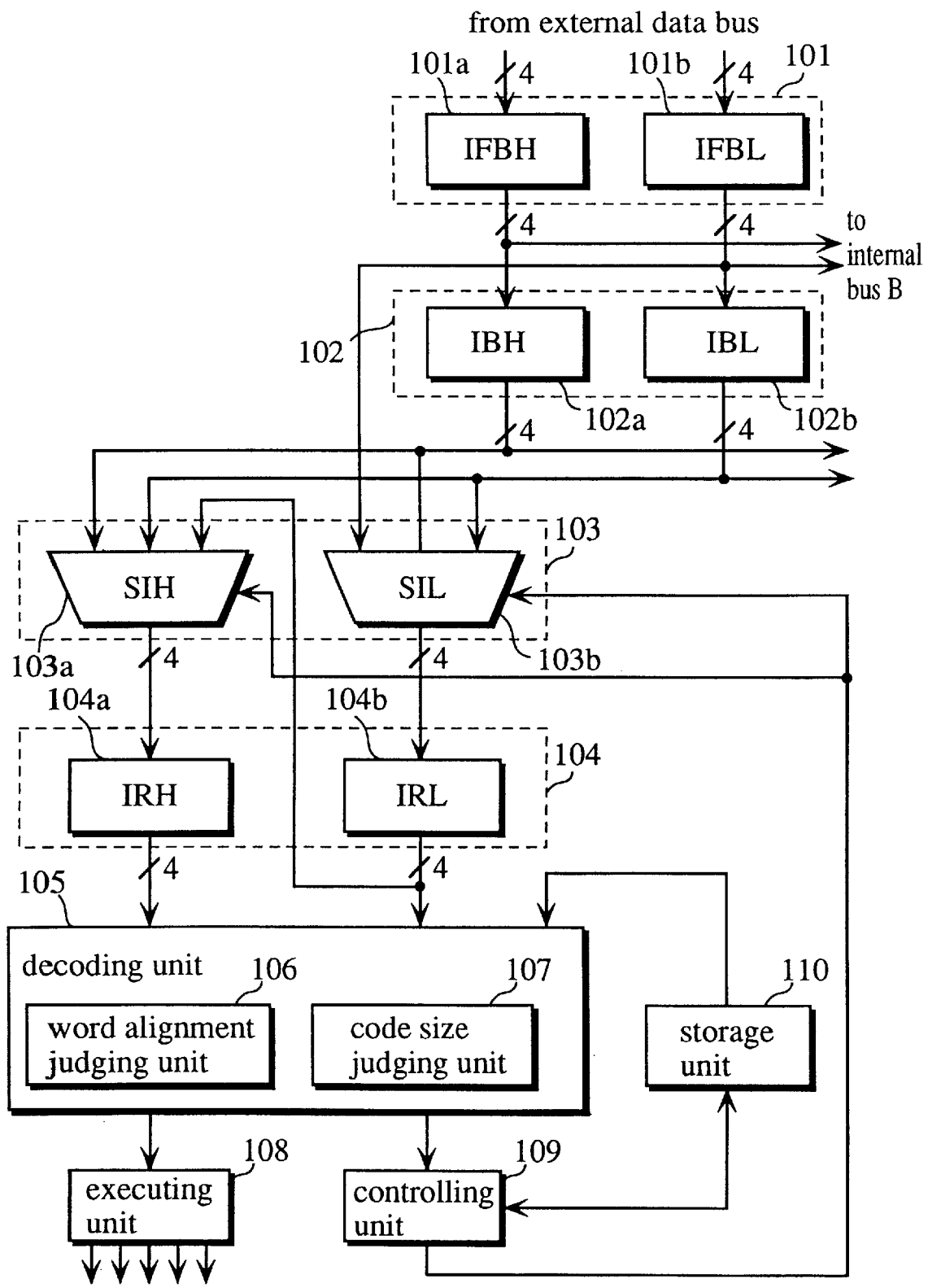
FIG. 4 is a block diagram showing a construction of instruction decoding block 100.

FIG. 4 is a block diagram showing a construction of instruction decoding block 100.

Instruction decoding block 100 for decoding instructions fetched from the external memory comprises instruction fetching buffer (IFB) 101, instruction buffer (IB) 102, instruction selector (SI) 103, instruction register (IR) 104, decoding unit 105, executing unit 108, controlling unit 109, and storage unit 110.

IFB 101 is a register for storing a 1-word code fetched from the external memory via external data bus 213.

A "word" is a unit for decoding instructions. The present apparatus deals with an 8-bit word, namely a 1-byte word. In First Embodiment, the external memory stores 1-word codes, namely 1-byte codes, each of which is located by a 16-bit address.

An "instruction" indicates a logical unit of directions to the processor, such as "add #4,d0." On the other hand, a "code" indicates a whole or a part of a coded instruction. For example, both "0c2" and "0c" are codes, where "0c2" represents instruction "add #4,d0" in hexadecimal notation and "0c" is a part of "0c2."

IFB 101 comprises high-order instruction fetching buffer (IFBH) 101a and low-order instruction fetching buffer (IFBL) 101b. Both stores a nibble (4 bits) of a fetched code. Note that prefetching counter (PFC) 206 of data path block 200 holds an external memory address of a code held by IFB 101, the address being sent via the address buses.

IB 102, being a register for storing a code output by IFB101, comprises high-order instruction buffer (IBH) 102a and low-order instruction buffer (IBL) 102b. Both stores a 1-nibble code. Note that a code having been held by IFB 101 and IB 102 is output to internal bus B 204 through a selector (not shown in the figure) according to an instruction from executing unit 108 and then transferred to data path block 200.

IR 104, being a register for storing a 1-byte code to be decoded, comprises high-order instruction register (IRH) 104*a* and low-order instruction register (IRL) 104*b*. Both stores a 1-nibble code. Note that DECPC 205 of data path block 200 stores an external memory address of a code held by IR 104.

IFB 101, IB 102, and IR 104 make up an instruction pipeline. In total, three bytes of codes (read codes for two bytes and a decoded code for one byte) are stored in this instruction pipeline:

SI 103 comprises two independent components: high-order instruction selector (SIH) 103*a* for transferring a nibble of a code stored in any of IBH 102*a*, IBL 102*b*, and IRL 104*b* to IRH 104*a*; and low-order instruction selector (SIL) 103*b* for transferring a nibble of a code stored in any of IFBL 101*b*, IBH 102*a*, and IBL 102*b* to IRL 104*b*.

Figure 5:
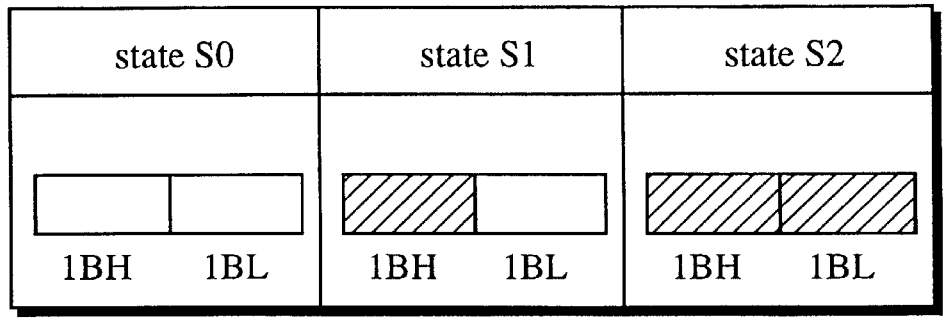
FIG. 5 shows the states of instruction decoding block 100 of a microprocessor of First Embodiment of the present invention.
Figure 5:

Storage unit 110 stores a numeral value which indicates how a code is stored in IB 102. More specifically, storage unit 110 stores a numeral value which corresponds to any of three states shown in FIG. 5: state S0 indicating that there is no 1-nibble code stored in IBH 102*a* and IBL 102*b*; state S1 a 1-nibble code is stored in IBH 102*a*, but not in IBL 102*b*; and state S2 both IBH 102*a* and IBL 102*b* store a 1-nibble code.

Decoding unit 105 refers to storage unit 110 and decodes a 1-byte code stored in IR 104, then send the result to executing unit 108 and controlling unit 109. Decoding unit 105 decodes as a general function, and also comprises code size judging unit 107 and word alignment judging unit 106.

Code size judging unit 107 judges whether a code to be decoded next is a 1-nibble code or a 1-byte code, and send the judgement to controlling unit 109.

Controlling unit 109 controls SI 103 based on a judgement sent from code size judging unit 107 and a state stored in storage unit 110, and updates the state stored in storage unit 110.

Word alignment judging unit 106 judges whether a decoded instruction is a branch-to-sub-routine instruction that is stored in a location in the external memory starting from a half-byte boundary, and send the judgement to executing unit 108. A byte boundary is a boundary between two neighboring 1-byte storage locations in the external memory. A half-byte boundary is a boundary between an upper-order nibble and a lower-order nibble, or a center, of a 1-byte storage location in the external memory.

Executing unit 108 controls the components of instruction decoding block 100 and data path block 200 based on the outputs of decoding unit 105, and performs data transfer, computations, etc. Note that FIGS. 3 and 4 do not show control signals which are sent from executing unit 108 to each of the components. Also note that all the components including executing unit 108 operate at each clock cycle in synchronization with a clock signal not shown in the figure.

(b) Instruction Formats

Figure 6A:
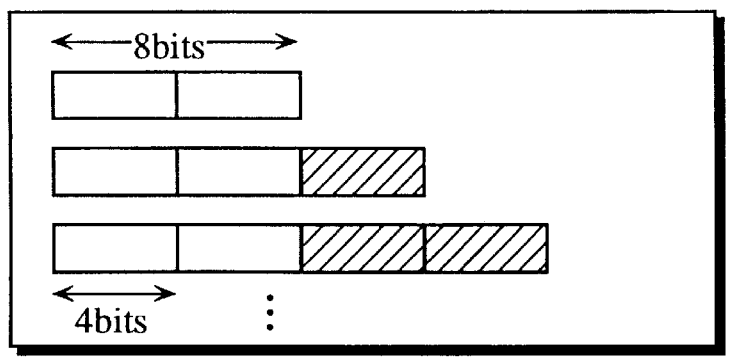
FIG. 6A and 6B show two types of instruction formats executed by a microprocessor of First Embodiment of the present invention.
Figure 6B:
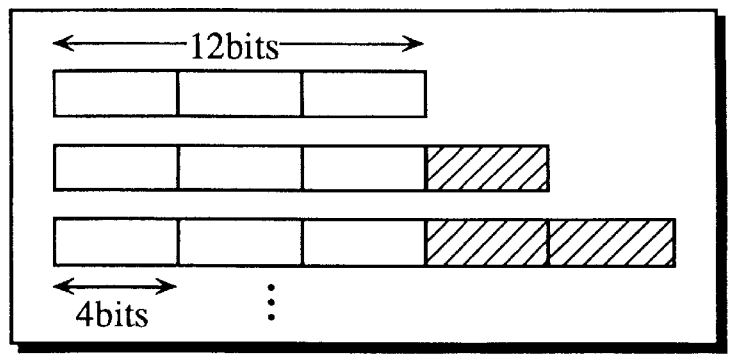

Now, instruction formats of the microprocessor of First Embodiment is described. FIG. 6 shows two types of instruction formats. All the instructions the present microprocessor decodes and executes fall into format 1 and format 2 as shown in FIGS. 6A and 6B.

Instructions in format 1 have a variable length and comprise a 1-byte basic instruction word and one or more 1-nibble extension words. Some instructions in format 1 may not have any extension words. The basic instruction word is an operation code for specifying an instruction, and is decoded by decoding unit 105. An extension word indicates a piece of data such as a displacement value, immediate value, etc., which is used in the computation executed by an instruction specified by the basic instruction word. The extension words are not decoded by decoding unit 105.

For example, instruction "add #2,d0" instructing the microprocessor to add immediate value 2 to a value stored in register d0 is represented by code "0c2" (hex). Code "0c2" comprises basic instruction word "0c" (hex) and extension word "2". Basic instruction word "0c" indicates, "add a value represented by a succeeding 1-nibble extension word to a value stored in register d0." While the present microprocessor requires only three nibbles, or 12 bits, a conventional one requires 16 bits in total for an instruction that instructs the microcomputer to compute using a value represented by a nibble. This is because the conventional microprocessor extends an instruction in units of bytes, representing the above extension word "02" (hex).

Accordingly, instructions in format 1 of the present microprocessor have less bits than corresponding instructions of the conventional microprocessor.

Instructions in format 2 have a 3-nibble basic instruction word and 1-nibble extension words, having variable length. For example, instruction "XOR #ff,d0" instructing the microprocessor to perform an exclusive-or operation on immediate value ff (hex) and a value stored in register d0 is represented by code "208ff" (hex). Code "208ff" comprises basic instruction word "208" (hex) and extension word "ff" (hex). Basic instruction word "208" indicates, "perform an exclusive-or operation on a value represented by succeeding two 1-nibble extension words and a value stored in register d0." When this instruction executed, only three nibbles of the basic instruction word are decoded by decoding unit 105.

It is defined that the first 1-nibble code of the basic instruction word of format 2 is "2" or "3", that is, the basic instruction word of format 2 is "2--" (hex) or "3--" (hex). By this arrangement, it is possible to judge whether an instruction is format 1 or 2 from only the value of the first nibble.

In this way, the present microprocessor has 8, 12, 16, 20, 24, . . . bits of instructions, with the minimum length of 8 bits, which can be extended in units of 4 bits. That means, instructions can be extended in units of 4 bits, which is smaller than a length of an instruction decoder (8 bits). Thus, the present microprocessor decreases the program size by decreasing the code size.

(c) Operation of the Microprocessor

Now, the operation of the present microprocessor is described.

Note that only characteristic operations of the present microprocessor are explained, and not other general operations. Therefore, mainly instruction decoding block 100 will be explained, and not data path block 200.

Decode Example 1

In this example, a 5-nibble instruction stored in a location in the external memory starting from a byte boundary is decoded and executed by the present microprocessor.

FIG. 7A shows the format of the instruction, comprising a 3-nibble basic instruction and two 1-nibble extension words. Signs A to E respectively represent the 1-nibble codes making up the instruction. FIG. 7B shows how 1-nibble codes of the instruction shown in FIG. 7A are aligned when the instruction is stored in a location in the external memory starting from a byte boundary. Note that the alignment order for the 1-nibble codes of the basic instruction word and that for those of extension words are different from each other.

FIG. 7C shows how the 1-nibble codes are stored in IFB 101, IB 102, and IR 104 and how is the state of storage unit 110 at each clock cycle when the instruction is read by instruction decoding block 100. IFB 101, IB 102, and IR 104 make up an instruction pipeline.

At clock cycle 1, 1-nibble codes B and A are fetched into IFB 101.

At clock cycle 2, 1-nibble codes E and C are fetched into IFB 101, and 1-nibble codes B and A are transferred to IB 102. Note that fetching or transferring of codes are performed according to the directions sent from executing unit 108 at each clock cycle. The state of storage unit 110 at clock cycle 2 is S2 since the preceding instruction has been decoded.

At clock cycle 3, controlling unit 109 recognizes the state of storage unit 110 to be S2, and receives from code size judging unit 107 a judgement that the next code to be decoded has one byte. As a result, controlling unit 109 directs SI 103 to transfer a 1-byte code stored in IB 102 to IR 104 by sending a selection signal to SI 103, and writes the state, "S2", into storage unit 110. According to the direction by the selection signal, SIH 103*a* transfers 1-nibble code A stored in IBL 102*b* to IRH 104*a*, and SIL 103*b* transfers 1-nibble code B stored in IBH 102*a* to IRL 104*b*.

As a result, IR 104 stores 1-nibble codes A and B, then the 1-nibble codes are decoded by decoding unit 105. From the decoding result of the first 1-nibble code A, code size judging unit 107 judges that the basic instruction word has three nibbles, and that the next code to be decoded has one nibble, which is the rest of the basic instruction word.

At clock cycle 4, controlling unit 109 recognizes the state of storage unit 110 to be S2, and receives from code size judging unit 107 a judgement that the next code to be decoded has one nibble. As a result, controlling unit 109 directs SI 103 to transfer a 1-nibble code stored in IBL 102*b* to IRL 104*b* by sending a selection signal to SI 103, and writes the state, "S1", into storage unit 110. According to the direction by the selection signal, SIH 103*a* transfers 1-nibble code B stored in IRL 104*b* to IRH 104*a*, and SIL 103*b* transfers 1-nibble code C stored in IBL 102*b* to IRL 104*b*.

As a result, IR 104 stores 1-nibble codes B and C, then the 1-nibble codes are decoded by decoding unit 105. According to the decode result, executing unit 108 transfers extension words D and E stored in IFB 101 and IB 102 to data path block 200 via internal bus B 204. Then, after some necessary data processing, the execution of the instruction is completed.

Note that in this example, it is defined that the first 1-nibble code A only conveys that the basic instruction word has three nibbles, and it is also defined that the succeeding 1-nibble codes B and C have the substantial instruction, e.g., "add an immediate value to a value stored in register d0." Therefore, executing unit 108 executes the instruction according to the decode result of 1-nibble codes B and C, and does not require the decode result of 1-nibble codes A and B.

In this way, decoding unit 105 correctly decodes a 3-nibble basic instruction word which is 1.5 times as large as the input capacity of decoding unit 105.

Decode Example 2

In this example, a 5-nibble instruction stored in a location in the external memory starting from a half-byte boundary is decoded and executed by the present microprocessor.

Figures 8A, 8B:
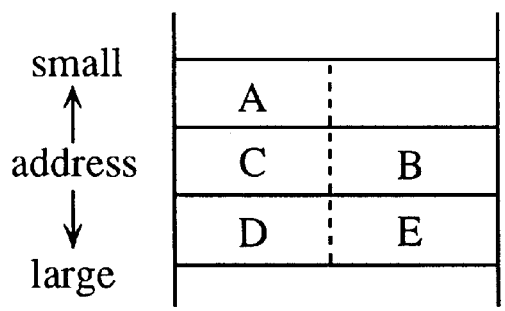
FIG. 8A shows how 1-nibble codes of the instruction shown in FIG. 7A are aligned when the instruction is stored in a location in the external memory starting from a half-byte boundary.
FIG. 8B shows the instruction pipeline at each clock cycle when the instruction shown in FIG. 7A is read by instruction decoding block 100.

The format of the instruction is the same as that of Decode example 1. FIG. 8A shows how 1-nibble codes of the instruction shown in FIG. 7A are aligned when the instruction is stored in a location in the external memory starting from a half-byte boundary.

FIG. 8B, as FIG. 7C in Decode example 1, shows the data flow in the instruction pipeline.

At clock cycle 1, 1-nibble code A is fetched into IFB 101.

At clock cycle 2, 1-nibble codes B and C are fetched into IFB 101, and 1-nibble code A is transferred to IB 102. The state of storage unit 110 at clock cycle 2 is S1 since the last 1-nibble code of the preceding instruction has been stored in a location in the external memory starting from a half-byte boundary.

At clock cycle 3, controlling unit 109 recognizes the state of storage unit 110 to be S1, and receives from code size judging unit 107 a judgement that the next code to be decoded has one byte. As a result, controlling unit 109 directs SI 103 to transfer a 1-byte code consisting of a nibble stored in IFB 101 and another nibble stored in IB 102 to IR 104 by sending a selection signal to SI 103, and writes the state, "S1", into storage unit 110. According to the direction by the selection signal, SIH 103*a* transfers 1-nibble code A stored in IBH 102*a* to IRH 104*a*, and SIL 103*b* transfers 1-nibble code B stored in IFBL 101*b* to IRL 104*b*.

As a result, IR 104 stores 1-nibble codes A and B, then the 1-nibble codes are decoded by decoding unit 105. From the decoding result of the first 1-nibble code A, code size judging unit 107 judges that the basic instruction word has three nibbles, and that the next code to be decoded has one nibble, which is the rest of the basic instruction word.

At clock cycle 4, controlling unit 109 recognizes the state of storage unit 110 to be S1, and receives from code size judging unit 107 a judgement that the next code to be decoded has one nibble. As a result, controlling unit 109 directs SI 103 to transfer a 1-nibble code stored in IBH 102*a* to IRL 104*b* by sending a selection signal to SI 103, and writes the state, "S2", into storage unit 110. According to the direction by the selection signal, SIH 103*a* transfers 1-nibble code B stored in IRL 104*b* to IRH 104*a*, and SIL 103*b* transfers 1-nibble code C stored in IBH 102*a* to IRL 104*b*.

As a result, IR 104 stores 1-nibble codes B and C, then the 1-nibble codes are decoded by decoding unit 105. According to the decode result, executing unit 108 transfers extension words D and E stored in IB 102 to data path block 200 via internal bus B 204. Then, after some necessary data processing, the execution of the instruction is completed.

In this way, the present microprocessor correctly decodes and executes an instruction even if the instruction is stored in a location in the external memory starting from a half-byte boundary.

Jump Example 1

Described in this example are the format of a jump instruction and the operation of the present microprocessor when the program jumps to a location in the external memory starting from a half-byte boundary.

Figure 9:
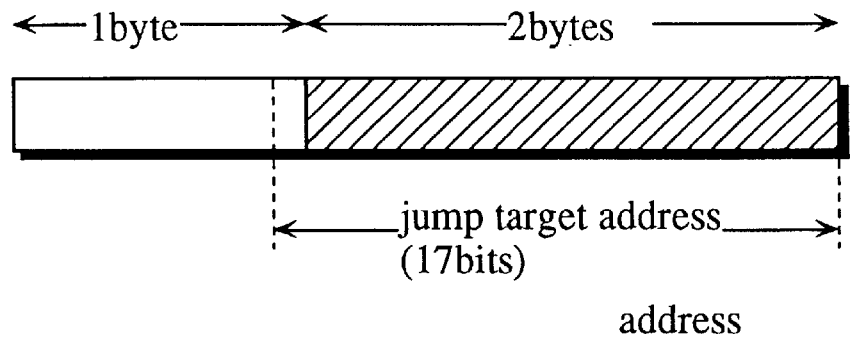
FIG. 9 shows the format of unconditional jump instruction "jmp."

FIG. 9 shows the format of unconditional jump instruction "jmp." This instruction consists of a basic instruction word of 8 bits and extension words of 16 bits, having six 1-nibble codes in total.

As for the present microprocessor, 16 bits are not enough for a jump instruction to specify a jump target address since a jump target instruction may be stored in a location in the external memory starting from a half-byte boundary. That is, it should be specified whether the program jumps to an upper-order nibble or to a lower-order nibble in the location specified by the 16-bit address. For this purpose, a 7-nibble instruction, having another nibble for specifying a jump target address, may be considered.

However, the 7-nibble instruction would include unnecessary three bits and increase the code size.

Therefore, the Least Significant Bit (LSB) of the basic instruction word of instruction "jmp" is used to indicate whether a jump target instruction is stored in a location in the external memory starting from a byte boundary or a half-byte boundary, as shown in FIG. 9. That is, it is defined that 17 bits comprising two bytes of extension words and the LSB of the basic instruction word are used to specify a jump target address. With this definition, unconditional jump instruction "jmp" is compressed to six 1-nibble codes from seven 1-nibble codes. This prevents the use of unnecessary bits for the codes.

Now, it is described how the present microprocessor operates when instruction "jmp" is executed.

It is supposed that instruction "jmp" has been fetched from the external memory, and that the 1-nibble codes are stored in IFB 101, IB 102, and IR 104.

Decoding unit 105 sends only information of LSB of the basic instruction word stored in IR 104 to controlling unit 109. Controlling unit 109 writes state "S1" into storage unit 110 if the received information is "1"; and "S2" if "0".

Then, decoding unit 105 decodes seven upper-order bits of the basic instruction word stored in IR 104, and sends a judgement to executing unit 108 that the instruction is an unconditional jump instruction. On receiving the judgement, executing unit 108 transfers a jump target address of 16 bits stored in IFB 101 and IB 102 to data path block 200, and outputs the address to external address bus 212. As a result, an instruction stored in a location in the external memory specified by an address sent via external address bus 212 is fetched into instruction decoding block 100 in units of bytes.

After the first byte of the instruction is transferred to IB 102, controlling unit 109 controls SI 103, based on the state of storage unit 110, so that a code to be decoded at the next clock cycle is determined.

More specifically, controlling unit 109 directs SI 103 to transfer a 1-byte code stored in IB 102 to IR 104 if the state of storage unit 110 is S2. This direction is the same as that shown in clock cycle 3 in Decode example 1 by which an instruction stored in a location in the external memory starting from a byte boundary is decoded. That is, it is equivalent to a jump to the byte boundary.

On the other hand, controlling unit 109 directs SI 103 to transfer a 1-byte code consisting of a nibble stored in IFB 101 and another nibble stored in IB 102 to IR 104 if the state of storage unit 110 is S1. This direction is the same as that shown in clock cycle 3 in Decode example 2 in which an instruction stored in a location in the external memory starting from a half-byte boundary is decoded. That is, it is equivalent to a jump to the half-byte boundary.

In this way, a jump to a byte boundary or a half-byte boundary executed by 3-byte unconditional jump instruction "jmp" completes.

Jump Example 2

Described below is the operation of the present microprocessor when a jump subroutine instruction (hereinafter instruction "jsr") is executed and an instruction stored in a location in the external memory starting from a half-byte boundary should be executed after the execution of the instruction "jsr."

Instruction "jsr" is a jump instruction that saves an address succeeding to the address of the instruction "jsr" into a storage section (hereinafter stack) specified by stack pointer (SP) 202a before the jump is executed. The saved address is also called a return address. Instruction "jsr" and a return instruction, which is used to indicate the end of a subroutine, are used together as a set. When instruction "jsr" is executed, a return instruction is also executed, then a return address stored in the stack is read and an instruction stored in a location specified by the return address is executed.

Meanwhile, as described in Jump example 1, at least 17 bits are required to specify a return address if the instruction is stored in a location in the external memory starting from a half-byte boundary. Accordingly, a code for specifying a return address requires three bytes. That means, the stack is accessed three times each time instruction "jsr" or a return instruction is executed.

As the number of accesses to the stack increases, the throughput of the microprocessor decreases. Especially, programs written by C language have frequent accesses to the stack. This affects the throughput of the microprocessor.

The present microprocessor reduces the code size. The present microprocessor can specify a return address with only two bytes even if the instruction "jsr" is to be stored in a location in the external memory starting from a half-byte boundary.

The format of instruction "jsr" is the same as that of unconditional jump instruction "jmp," as shown in FIG. 9. That is, the instruction comprises a basic instruction word of 8 bits and extension words of 16 bits. A jump address is specified by the LSB of the basic instruction word and extension words of 16 bits. Therefore, a jump is executed the same as in Jump example 1 whether the program jumps to a byte boundary or to a half-byte boundary in the external memory.

Figure 10:
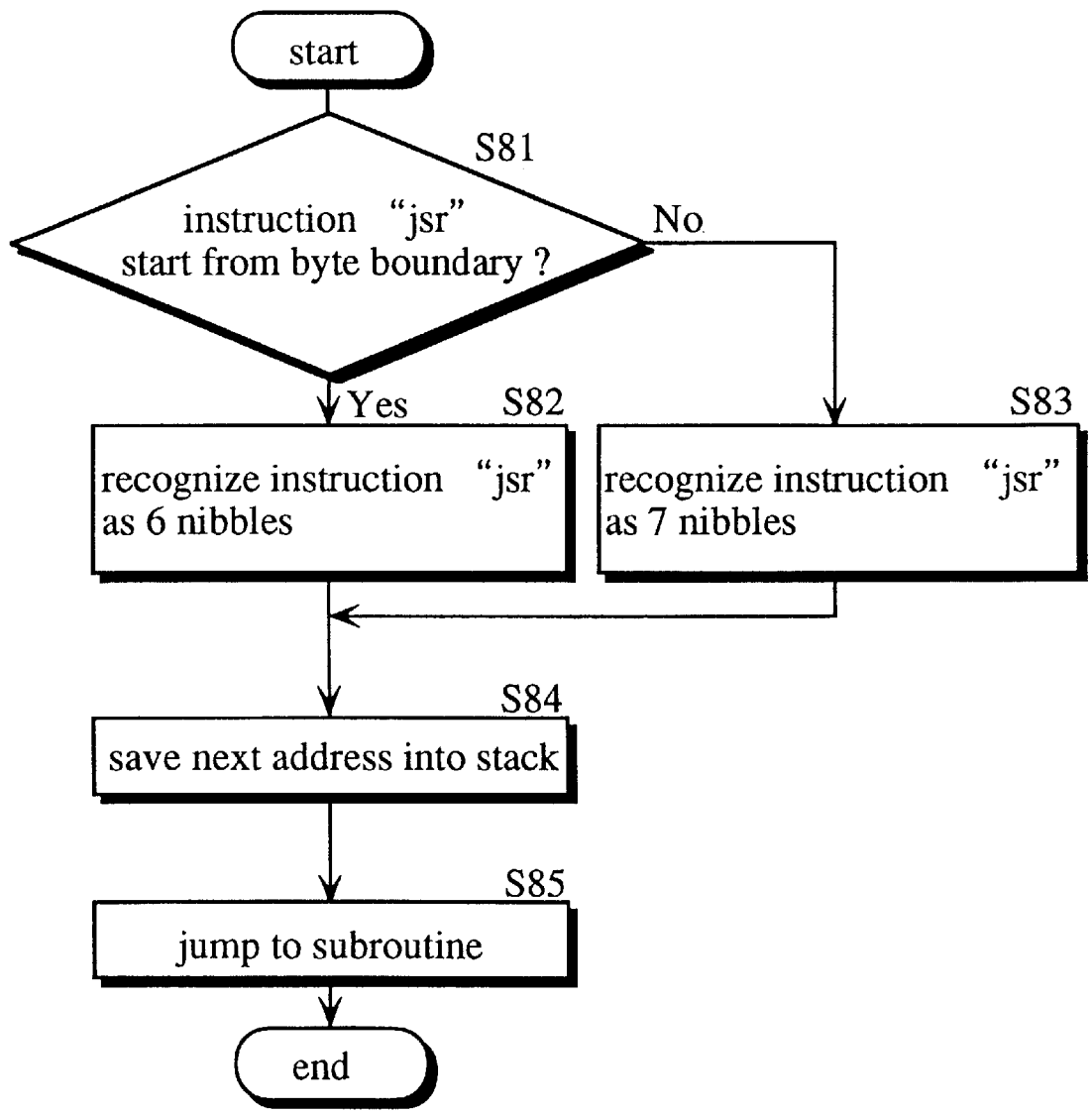
FIG. 10 is a flowchart showing the operation of a microprocessor of First Embodiment of the present invention when instruction "jsr" is executed.

Now, it is described how the present microprocessor operates when instruction "jsr" is executed with reference to FIG. 10.

FIG. 10 is a flowchart showing a process of the present microprocessor in executing instruction "jsr."

After the basic instruction word of instruction "jsr" is stored in IR 104, word alignment judging unit 106 identifies the instruction, judges whether the instruction has been stored in a location in the external memory starting from a byte boundary or from a half-byte boundary by referring to the state of storage unit 110, and sends the judgement to executing unit 108 (step S81).

Figure 11A:
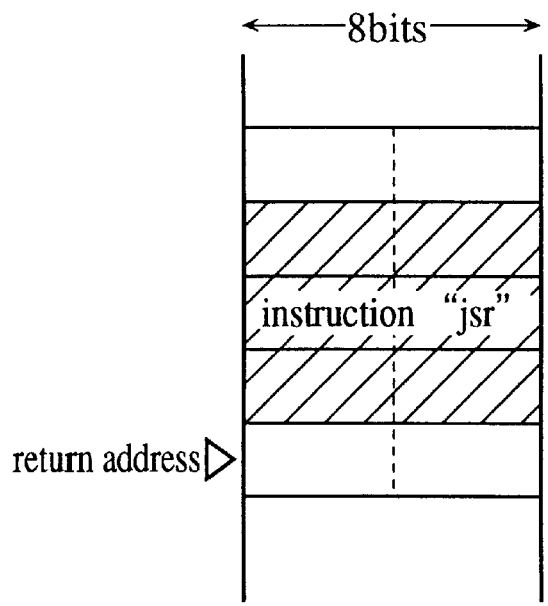
FIG. 11A shows relation between instruction "jsr" stored in a location in the external memory starting from a byte boundary and the return address.

On receiving a judgement that the instruction has been stored in a location starting from a byte boundary, executing unit 108 recognizes the length of the instruction as 6 nibbles (step S82), saves into the stack a 16-bit address which succeeds to the address of the instruction and specifies a byte boundary (step S84). FIG. 11A shows the relation between instruction "jsr" stored in a location starting from a byte boundary and the return address.

Figure 11B:
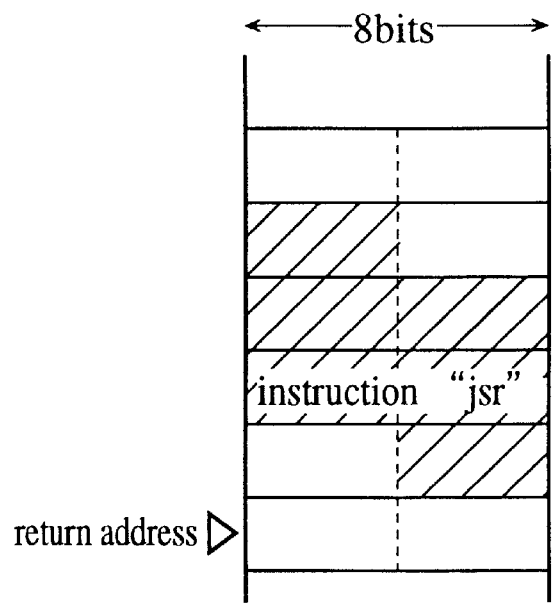
FIG. 11B shows the relation between instruction "jsr" stored in a location in the external memory starting from a half-byte boundary and the return address.

On the other hand, on receiving a judgement that the instruction has been stored in a location starting from a half-byte boundary, executing unit 108 recognizes the length of the instruction as 7 nibbles (step S83), saves into the stack a 16-bit address which succeeds to the address of the 7-nibble instruction and specifies the byte boundary (step S84). More specifically, executing unit 108 reads an address of the instruction from DECPC 205, sends the address to ALU 208, computes a return address assuming that the length of the instruction is 7 nibbles, and controls related components so that the obtained return address is written onto the stack. FIG. 11B shows the relation between instruction "jsr" stored in a location starting from a half-byte boundary and the return address.

After the return address is saved into the stack, the microprocessor operates the same as Jump example 1. Executing unit 108 jumps to a subroutine specified by the low-order 17 bits of the instruction (step S85).

In this way, a return address to be stored in the stack requires only 2 bytes whether instruction "jsr" is stored in a location in the external memory starting from a byte boundary or from a half-byte boundary.

When a return instruction is executed after the execution of the subroutine has completed, executing unit 108 reads the return address from the stack, stores the address in ADB 209, and directs concerned components to execute an instruction stored in a location in the external memory specified by the return address.

To realize the above operations, instruction "jsr" and the next instruction must be aligned in the external memory in accordance with the above operations. That is, instruction "jsr" should be regarded as having 7 nibbles when it is stored in a location in the external memory starting from a half-byte boundary. This is done by an address allocating program, what is called a linker. The operation of the linker is not explained here since it is not related to the subject of the present invention.

As understood from the above description, the present microprocessor stores a return address of only two bytes whether an instruction is stored in a location in the external memory starting from a byte boundary or from a half-byte boundary. Accordingly, the processing time is reduced.

Note that the units defined by the present Embodiment may be changed. For example, one word may have 12 bits instead of 8 bits. In that case, all the components of instruction decoding block 100 and data path block 200 will be adjusted to treat 12 bits, and the codes will also be adjusted the same.

Also note that storage unit 110 may store information other than the state of IB 102. For example, storage unit 110 may store the states of IFB 101 and IB 102. With this arrangement, more specific controls will be available.

Also note that the number of stages in the instruction pipeline is not limited to "3," which is shown in the present Embodiment with the stages IFB 101, IB 102, and IR 104.

Second Embodiment (a) Construction

Figure 12:
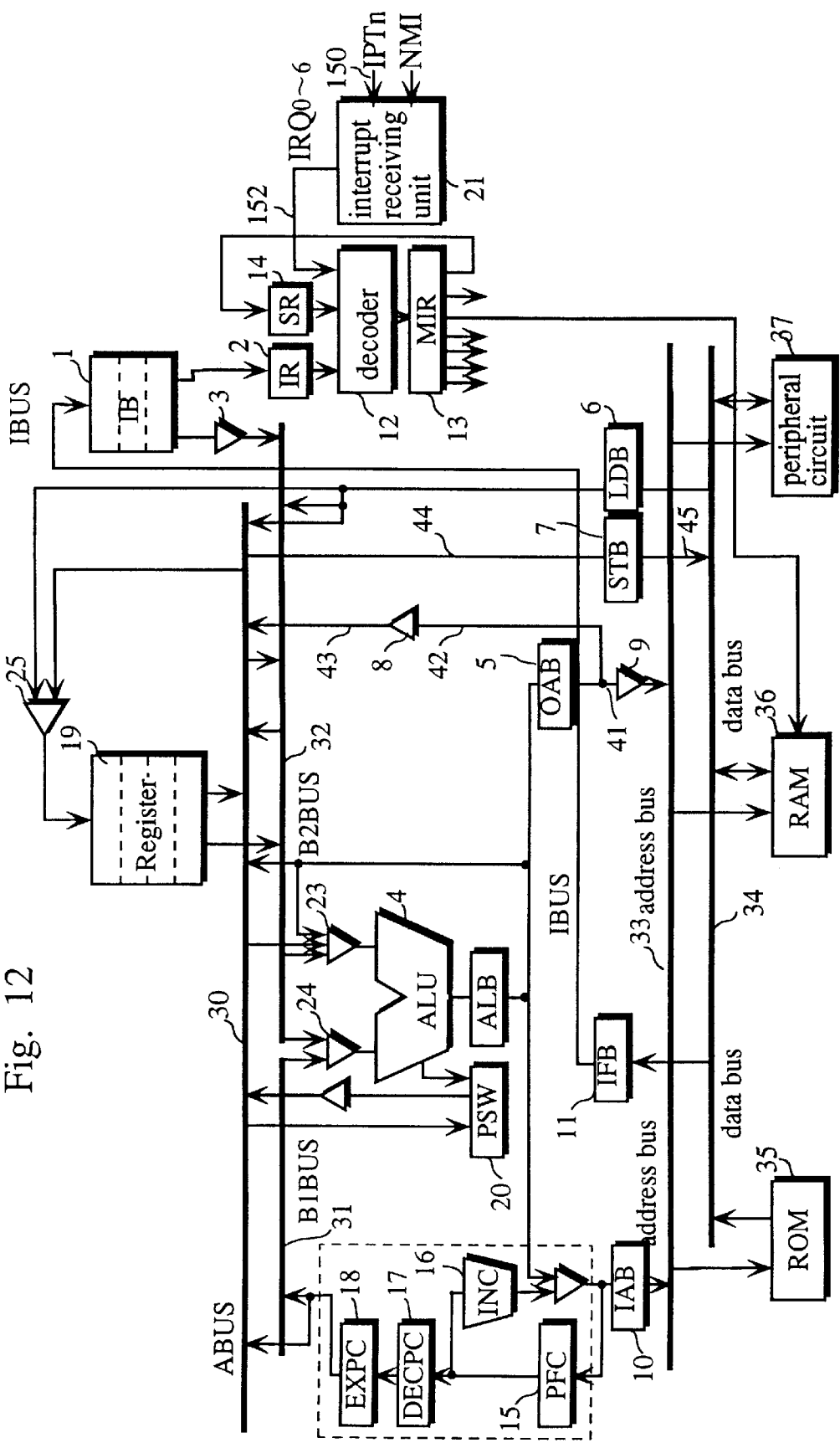
FIG. 12 is a block diagram showing a construction of a microprocessor of Second Embodiment of the present invention.

FIG. 12 is a block diagram showing a construction of a microprocessor of Second Embodiment of the present invention.

The microprocessor comprises instruction buffer 1, instruction register 2, driver 3, ALU 4, operand address buffer 5, load buffer 6, store buffer 7, driver 8, driver 9, instruction address buffer 10, instruction fetching buffer 11, decoder 12, micro instruction register 13, status register 14, pre-fetch counter 15, incrementer 16, decode program counter 17, execution program counter 18, register group 19, program status word 20, interrupt receiving unit 21, selector 23, selector 24, selector 25, internal bus 30, internal bus 31, internal bus 32, address bus 33, data bus 34, ROM 35, RAM 36, peripheral circuit 37, path 41, path 42, path 43 and path 44.

In FIG. 12, ROM 35 and RAM 36 respectively store instructions and data. Also, peripheral circuit 37 includes I/O devices such as a timer, a serial port, etc. Each I/O device is allocated a memory address (what is called memory-mapped I/O).

Instruction buffer 1 (hereinafter IB 1, as shown in the figure) prestores an instruction fetched from ROM 35 before the instruction is executed.

Instruction register 2 (hereinafter IR 2, as shown in the figure) stores an instruction to be decoded by decoder 12.

Driver 3 is a three-state driver for outputting the data stored in IB 1 to B2BUS 32. More specifically, if absolute addresses or operand values are stored in IB 1, the data is output under the control of micro instruction register 13.

ALU 4, controlled by decoder 12, performs general computations, address computations, etc. For example, in address computation, if an indirect address with displacement is specified by an operand in instruction, ALU 4 computes the target memory address from a value stored in an address register in register group 19 and a displacement value (disp) stored in IB 1, and output the computed address to operand address buffer 5. If an absolute address is specified by an operand in an instruction, ALU 4 transfers the absolute address from IB 1 to operand address buffer 5.

Operand address buffer 5 (hereinafter OAB 5) is a buffer of 16 bits for storing a target memory address. Memories to be accessed are ROM 35, RAM 36, and peripheral circuit 37.

Load buffer 6 (hereinafter LDB 6) is a buffer with 16 bits for storing data of the target memory address stored in OAB 5.

Store buffer 7 (hereinafter STB 7) is a buffer of 16 bits for storing data to be written to a location in a memory specified by an address stored in OAB 5.

Driver 8 is a three state driver for sending data stored in OAB 5 to ABUS 30 under the control of decoder 12 and MIR 13 when an interrupt is processed.

Driver 9 is a three state driver for outputting data stored in OAB 5 to address bus 33 under the control of decoder 12 and MIR 13 when a memory is accessed. That is, a value stored in OAB 5 is sent to ROM 35, RAM 36, and peripheral circuit 37 as a memory address.

Instruction address buffer 10 (hereinafter IAB 10) stores a 16-bit address of a location in ROM 35 in which an instruction to be fetched is stored.

Instruction fetching buffer 11 (hereinafter IFB 11) stores a 16-bit instruction fetched from ROM 35.

Decoder 12 decodes an instruction stored in IR 2 and data in status register 14, and outputs a micro instruction for executing the instruction.

Micro instruction register 13 (hereinafter MIR 13) sends a control signal corresponding to a micro instruction output from decoder 12.

Status register 14 (hereinafter SR 14) stores status flags that are used for decoding instructions.

Pre-fetch counter 15 (hereinafter PFC 15) and Incrementer 16 make up what is called a program counter that, under the control of decoder 12, sequentially generates addresses of instructions to be fetched.

Decode program counter 17 (hereinafter DECPC 17) stores an address of an instruction which is in the instruction decoding stage.

Execution program counter 18 (hereinafter EXPC 18) stores an address of an instruction which is in the instruction executing stage.

Register group 19 comprises four data registers D0 to D3, four address registers A0 to A3, and a stack pointer, each of which having 16 bits.

Program status word 20 (hereinafter PSW 20) stores flags for indicating the internal states of the microprocessor.

Interrupt receiving unit 21 receives interrupt signals IPT 0 to IPT 6, and outputs interrupt level signals according to the levels of received interrupt signals. Interrupt signals IPT 0 to IPT 6 indicate interrupt requests sent from external I/O devices. An interrupt level signal, having any of priority levels IRQ 0 TO IRQ 6, requests decoder 12 to process an interrupt according to the level. When receiving a non-maskable interrupt (hereinafter NMI), interrupt receiving unit 21 outputs the NMI to decoder 12 as it is. An NMI is an interrupt that takes priority over interrupt signals IPT 0 to IPT 6 and cannot be masked by software.

Selector 23 selectively transfers data from any of internal bus 30, internal bus 32, and ALU 4 to an input port of ALU 4.

Selector 24 selectively transfers data from any of internal bus 31 and internal bus 32 to the other input port of ALU 4.

Internal bus 30 (hereinafter ABUS 30), internal bus 31 (hereinafter B1BUS 31), and internal bus 32 (hereinafter B2BUS 32) are internal buses of the microprocessor.

Figure 13:
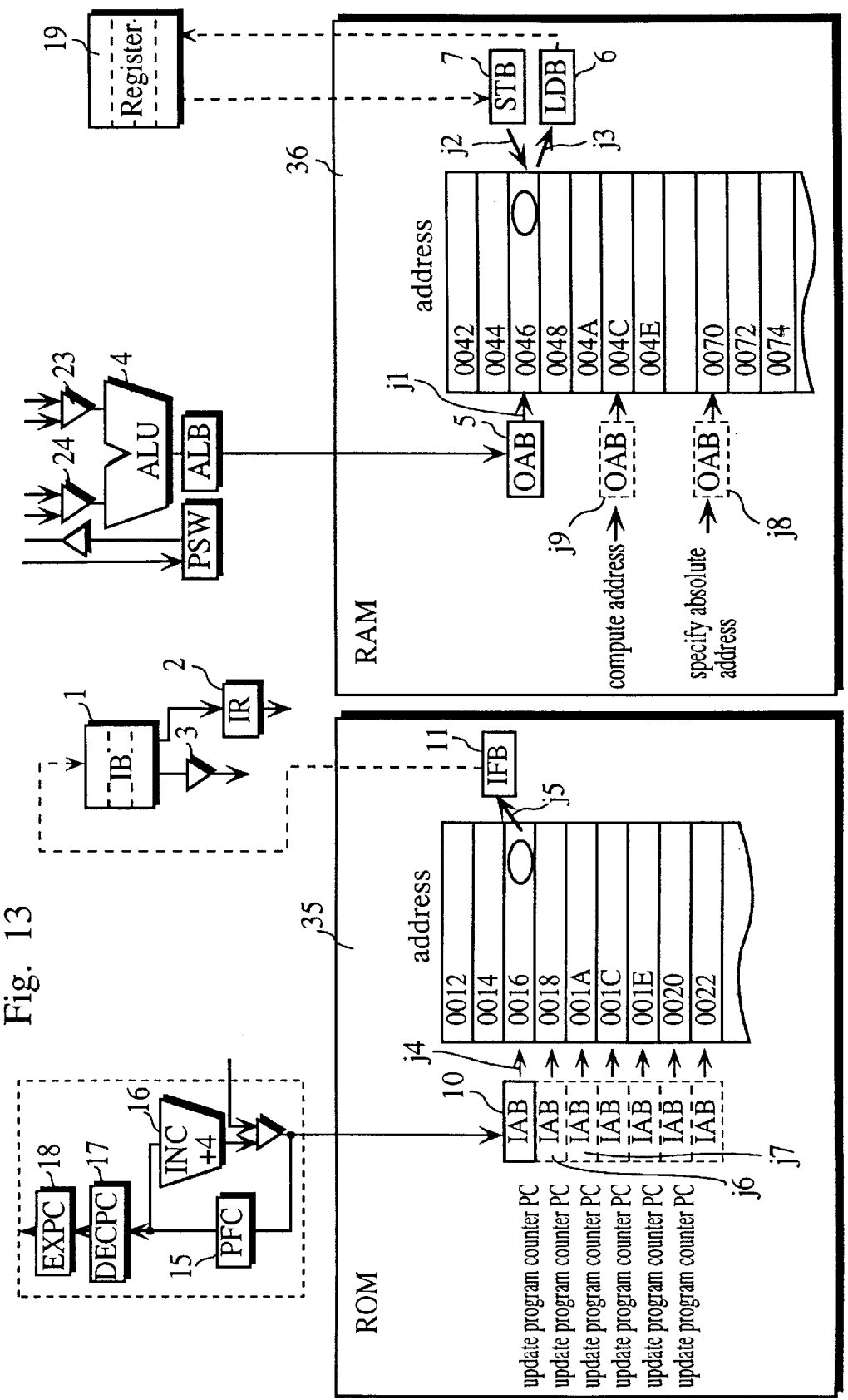
FIG. 13 shows how buffers OAB 5, LDB 6, STB 7, IAB 10, AND IFB 11 are used in the microprocessor.

Now, functions of various buffers are explained. FIG. 13 shows how buffers OAB 5, LDB 6, STB 7, IAB 10, and IFB 11 are used in the microprocessor.

As shown in the figure, OAB 5 holds a target RAM 36 address as indicated by arrow j1. LDB 6 holds data read from a location in RAM 36 specified by the target address as indicated by arrow j3. STB 7 holds data to be written to the same location in RAM 36 as indicated by arrow j2.

On the other hand, IAB 10 holds a target ROM 35 address as indicated by arrow j4, and IFB 11 holds an instruction read from a location in ROM 35 specified by the target address as indicated by arrow j5.

As the program counter is updated, the value stored in IAB 10 is also updated as indicated by broken-line rectangles j6 and j7. That is, the value is updated each time the program counter is updated. On the other hand, the value stored in OAB 5 is updated when an address is computed or when an absolute address is specified as indicated by broken-line rectangles j8 and j9. That is, the value is not updated unless an address is computed or unless an absolute address is specified.

(b) PA Addressing

The present microprocessor uses instructions which specify a value stored in an OAB as a target memory address. In this document, such an addressing method is called the Previous Address (PA) addressing.

Figure 14A:
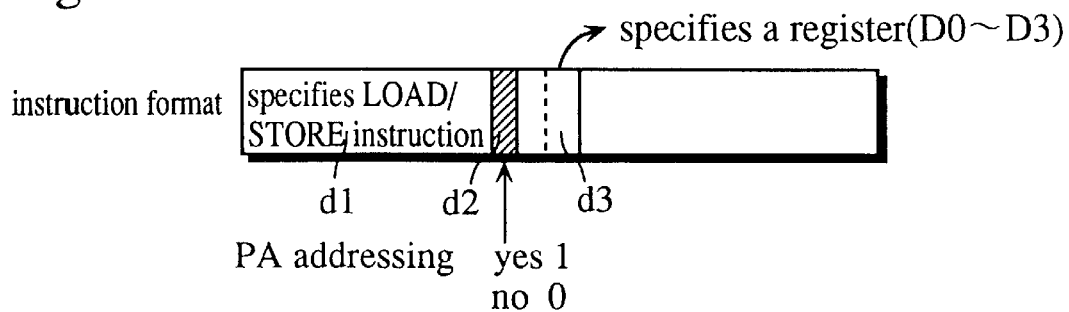
FIG. 14A shows a common format of LOAD instruction and STORE instruction for the PA addressing.

FIG. 14A shows the common format of LOAD instruction and STORE instruction for the PA addressing.

A specification of the target memory address is realized by specifying "(PA)" (a mnemonic representation) for an operand in an instruction.

As shown in FIG. 14A, the format of LOAD/STORE instruction includes field dl that indicates an instruction type (LOAD instruction, STORE instruction, etc.), field d2 of one bit that specifies the PA addressing for machine-language codes, and field d3 of two bits for specifying any of data registers D0 to D3 of register group 19.

Field d1 specifies whether the instruction is LOAD or STORE, whether the operation is addition, subtraction, multiplication, division, or shift, and whether the instruction uses 8-bit data or 16-bit data.

Field d2 specifies whether the PA addressing is used: "1" for "used"; and "0" for not.

Field d3 specifies a register whose value is used as an operand: "00" for register D0, "01" D1, "10" D2, and "11" D3.

Figure 14B:
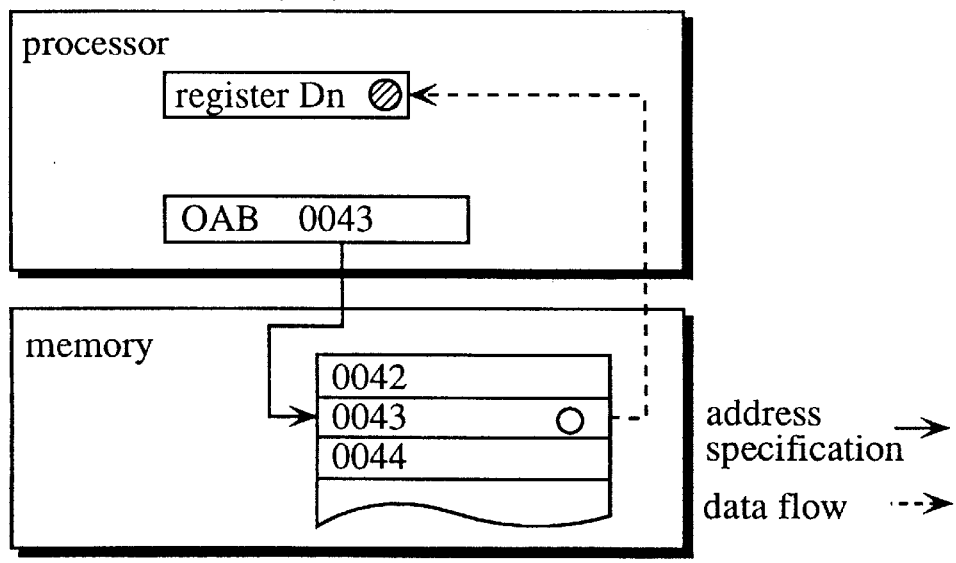
FIG. 14B shows the LOAD instruction for the PA addressing.
Figure 14C:
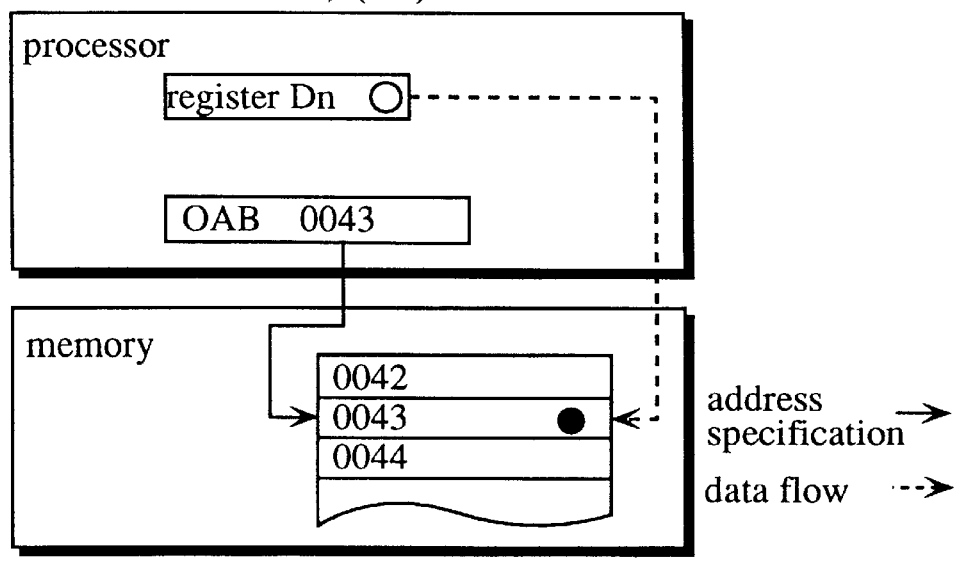
FIG. 14C shows the STORE instruction for the PA addressing.

FIG. 14B shows the LOAD instruction for the PA addressing; and FIG. 14C the STORE instruction. "LD (PA),Dn" in the figure indicates a LOAD instruction for the PA addressing. While a general LOAD instruction reads data from a memory and stores the data into a register, a LOAD instruction for the PA addressing reads data from a location in a memory at an address which is stored in the operand address buffer.

For example, in the same figure, address "0043" is stored in the operand address buffer. Here, if operand (PA) is specified in the LOAD instruction, data stored in a location at address "0043" is read and transferred to data register Dn, as indicated by the broken-line arrow.

"ST Dn,(PA)" in FIG. 14C indicates a STORE instruction of the PA addressing. A general STORE instruction reads data from a register and stores the data in a location in a memory. A STORE instruction of the PA addressing stores the data to a location in a memory specified by an address stored in OAB.

For example, in FIG. 14C, address "0043" is stored in OAB. Here, if operand (PA) is specified in the STORE instruction, data stored in data register Dn is transferred to a location in a memory specified by address "0043", as indicated by the broken-line arrow.

Figure 1:
FIG. 1 shows a format of an instruction used in a conventional microprocessor.
Figure 2A:
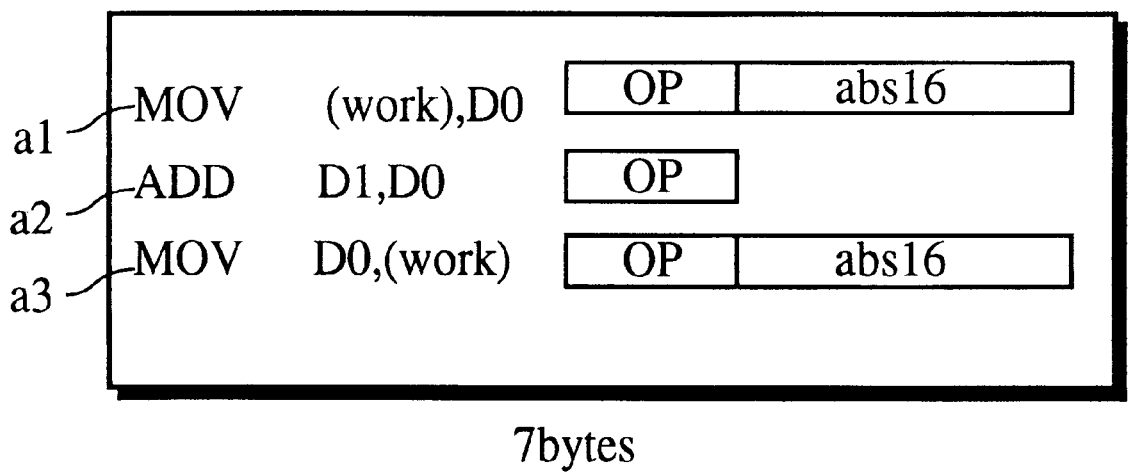
FIG. 2A shows a conventional program including two specifications of absolute address.
Figure 2B:
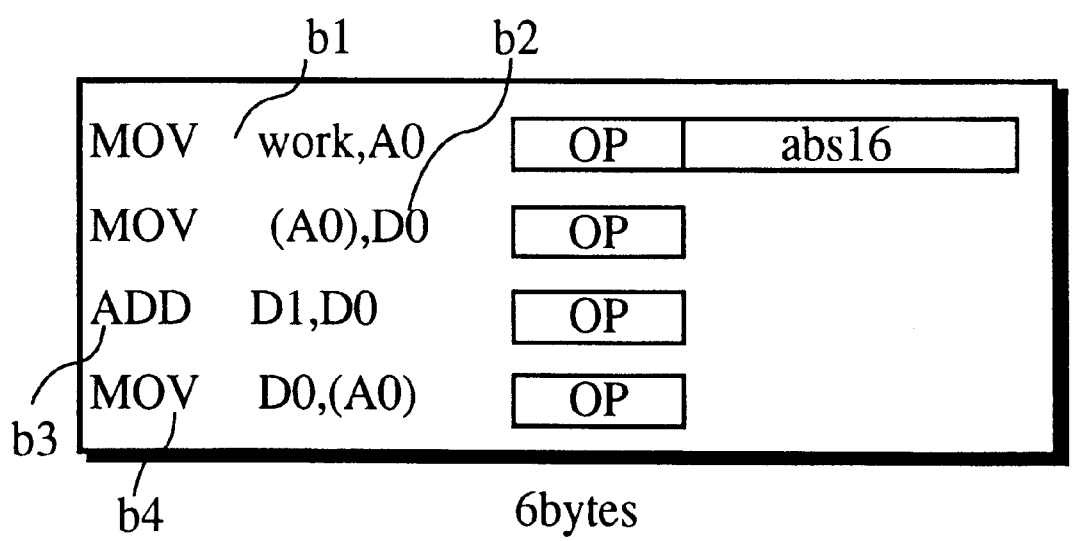
FIG. 2B shows a conventional program including a LOAD instruction and a STORE instruction using address register.
Figure 15A:
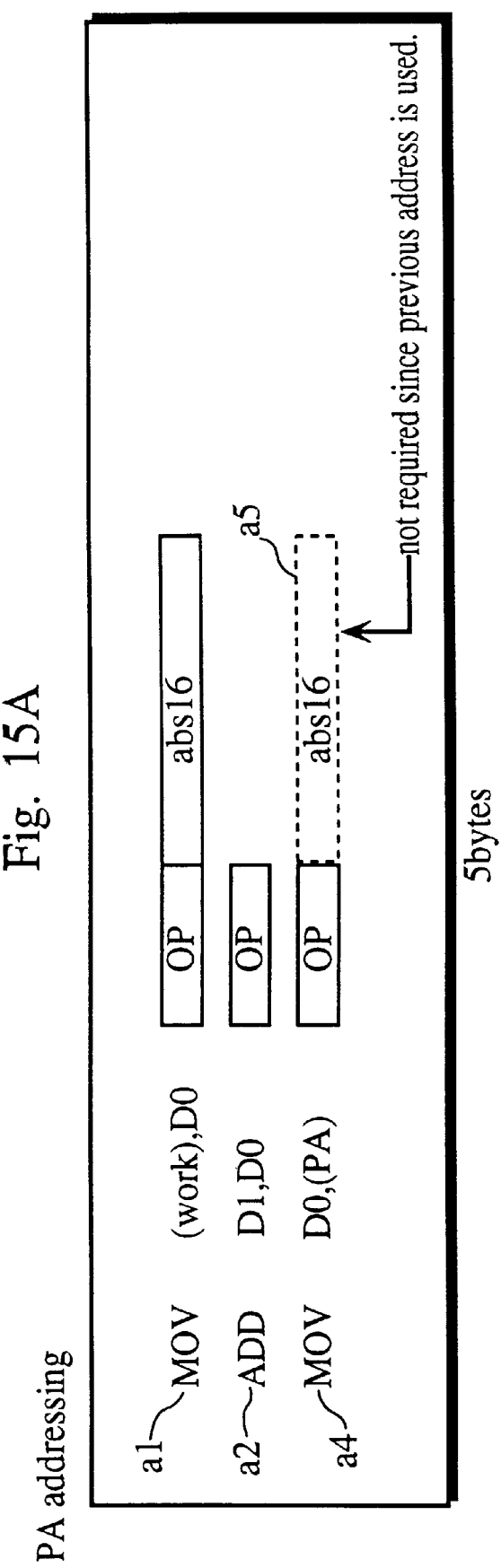
FIG. 15A shows a program segment for the PA addressing.
Figure 15B:
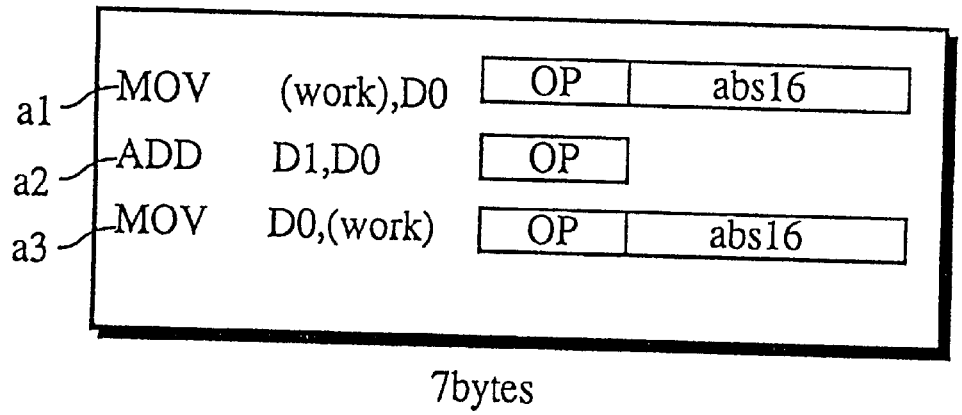
FIG. 15B shows a conventional program segment for the PA addressing specifying two absolute addresses.
Figure 15C:
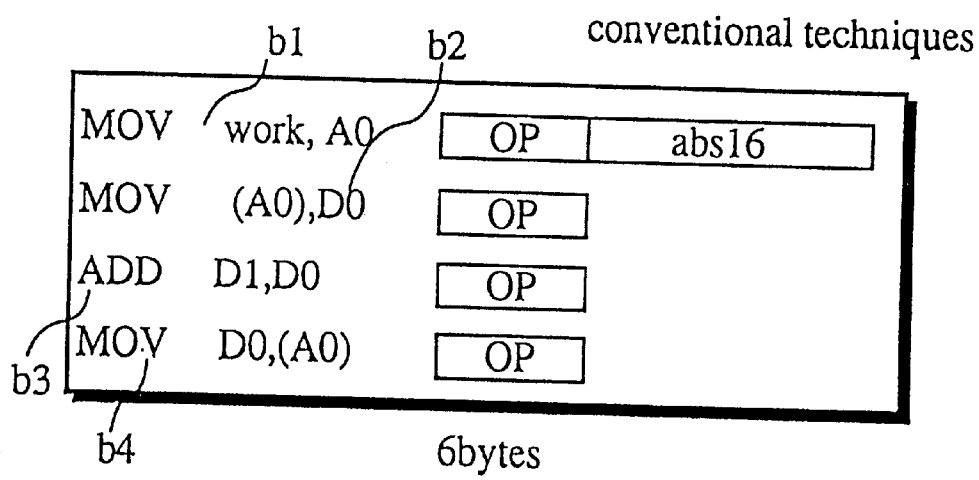
FIG. 15C shows a conventional program segment for the PA addressing including LOAD instruction and STORE instruction using an address register.

In FIGS. 15A, 15B and 15C, a PA addressing program (FIG. 15A) is compared to programs of the conventional techniques (FIGS. 15B and 15C), which are taken from FIG. 2A and 2B. Note that these programs instruct the microprocessor to read a value stored in a memory, compute with the value, and store the computation result in the memory.

FIG. 15A shows a program for reading/writing data from/into a memory with the PA addressing. FIG. 15B shows a program for the same with specifications of two absolute addresses. FIG. 15C shows a program for the same with the use of an address register.

The FIG. 15A program transfers data from a memory to a register by specifying an absolute address. So far, it is the same as the FIG. 15B program (instruction a1 and a2 ). However, while the FIG. 15B program specifies an absolute address again to transfer data from the register to the memory (instruction a3), the FIG. 15A program specifies the previous address (PA) (instruction a4). Accordingly, it is apparent that the specification of the absolute address encircled by a broken-line rectangle a5 is not required when the program is coded by the PA addressing.

Now, FIG. 15A is compared to FIG. 15C. The program of FIG. 15C includes instruction b1 that transfers an absolute address to an address register, instruction b2 which is a LOAD instruction that uses the address register, and instruction b4 which is a STORE instruction that uses the address register. On the contrary, the FIG. 15A program does not include any instructions that use an address register.

Now, these programs are compared to each other in terms of the code size. The FIG. 15A program is smaller than the FIG. 15B program by two bytes, and smaller than the FIG. 15C program by one byte. Therefore, it is apparent that a large number of reading/writing of data from/into memories, peripheral circuits, etc., can be written by the reduced code size.

(c) Operation

Now, the operation of the microprocessor of Second Embodiment is described. It is supposed that the running program includes the instructions shown below, where instructions (2) to (4) are the same as three instructions of the FIG. 15A program.

(1) LD (d8,An),Dn (2) LD (abs16),Dn (3) ADD Dm,Dn (4) ST Dn,(PA).

(c)-1

Figure 16:
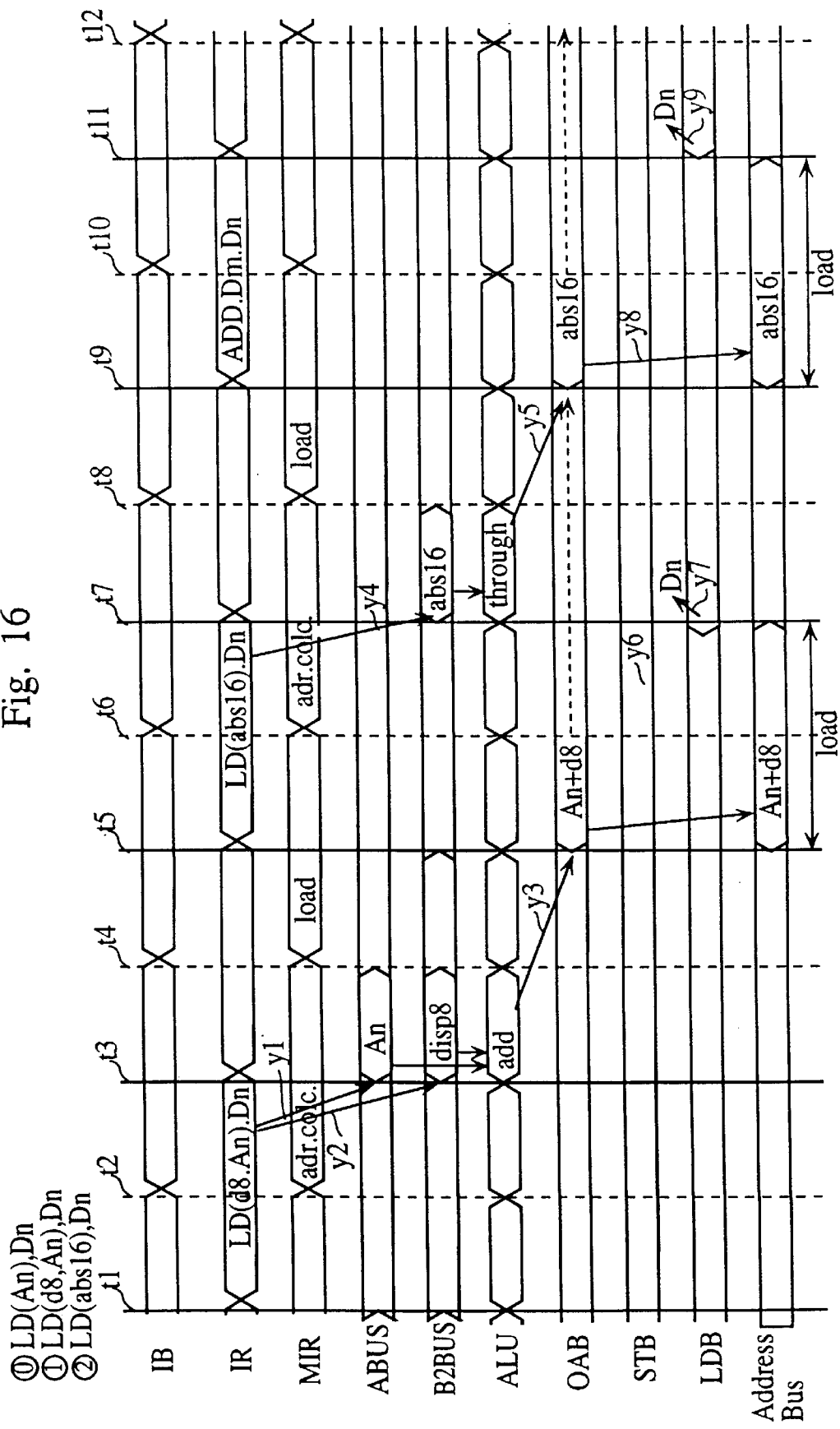
FIG. 16 is a timing chart showing the operation of each component shown in FIG. 12.
Figure 17:
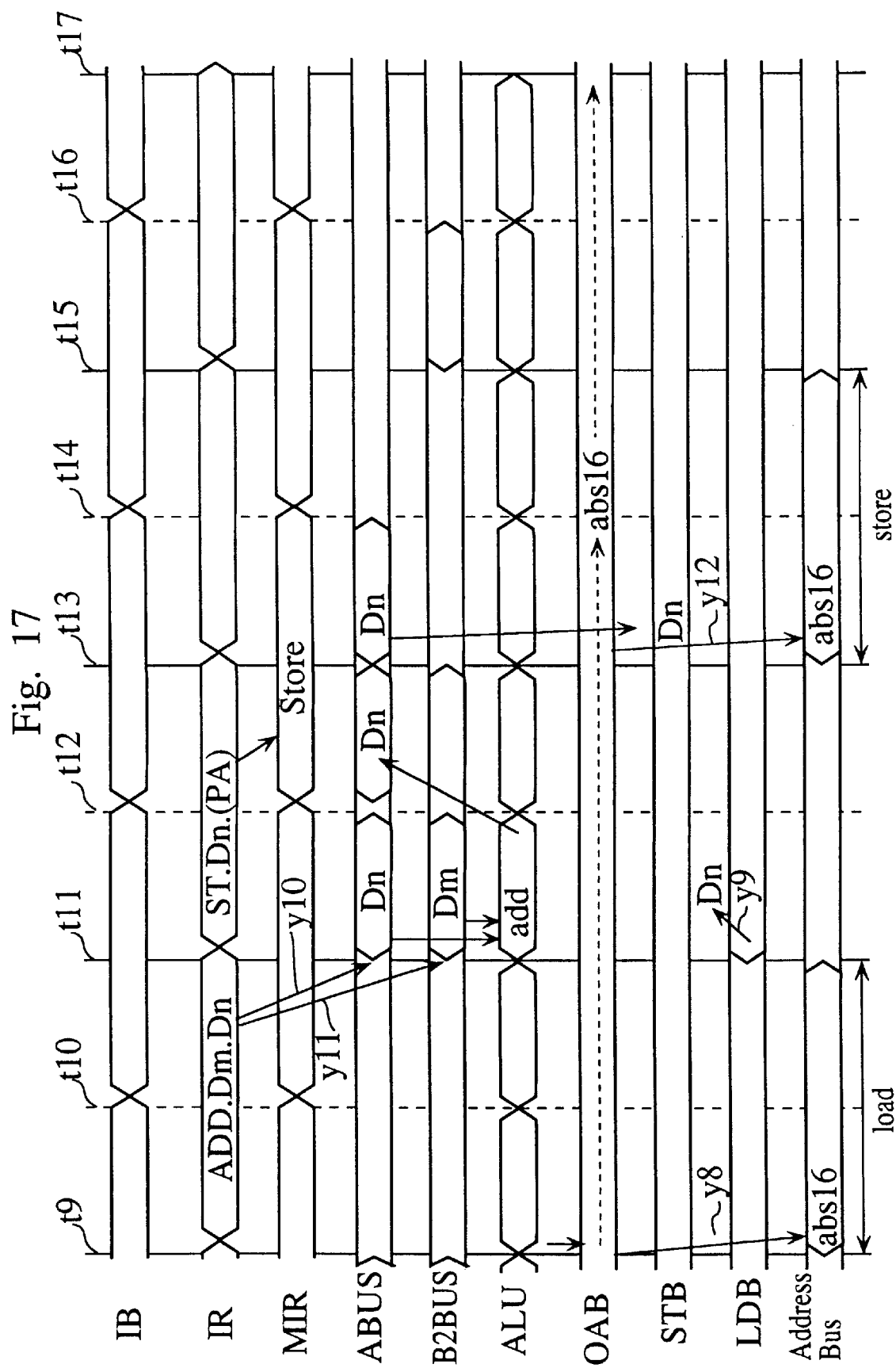
FIG. 17 is a timing chart showing the operation of each component shown in FIG. 12.

FIGS. 16 and 17 are timing charts showing the operation of the components shown in FIG. 12. It is supposed that instruction "LD (An),Dn" has been executed before time t1.

At time t1, OAB 5 holds a value "An" stored in address register An which is an address value included in the source operand of instruction "LD (An),Dn." Also at time t1, an operation code of instruction "LD (d8,An),Dn" is transferred from IB 1 to IR 2. The operation code is decoded by decoder 12.

At time t2, on receiving the decoded operation code, MIR 13 sends a control signal so that address computation "adr.calc" is performed. MIR 13 outputs value "An" stored in an address register of register group 19 to ABUS 30 (arrow y1). MIR 13 directs driver 3 to output a displacement value (disp 8) stored in IB 1 to B2BUS 32 (arrow y2).

At time t3, value "An" appears in ABUS 30, and B2BUS 32 has a 8-bit displacement value (disp 8). MIR 13 sends a control signal so that a selector (23 or 24) is switched to the other, and that ALU 4 performs an add operation using the value stored in the address register and an 8-bit displacement value (disp 8).

At time t4, MIR 13 sends a control signal so that "load" is performed. Then, the result of the add operation, "An+disp8," is transferred from ALU 4 to OAB 5 (arrow y3).

OAB 5 holds the previous target memory address, "An", during time t1 through t4, then holds "An+disp8" at time t5.

At time t6, MIR 13 sends a control signal so that driver 9 transfers value "An+disp8" from OAB 5 to address bus 33. Also, MIR 13 sends a control signal so that data is loaded from RAM 36 (arrow y6). As a result, data stored in a location in RAM 36 specified by address "An+disp8" is transferred to LDB 6 via data bus 34. Then, the data is transferred from LDB 6 to data register Dn of register group 19 through selector 25 (arrow y7).

(c)-2

At time t5, an operation code of instruction "LD (abs16), Dn" is transferred from IB 1 to IR 2. The operation code is decoded by decoder 12.

At time t6, on receiving the decoded operation code, MIR 13 sends a control signal so that address computation "adr.calc" is performed. MIR 13 sends a control signal so that driver 3 transfers a 16-bit absolute address (abs16) from IB 1 to B2BUS 32 (arrow y4). As a result, the absolute address is transferred to OAB 5 via B2BUS 32 through ALU 4 (arrow y5).

OAB 5 holds target memory address "An+disp8" of instruction "LD (d8,An),Dn" during time t5 through t8, then holds "abs16" at time t9.

At time t9, MIR 13 sends a control signal so that driver 3 transfers value "abs16" from OAB 5 to address bus 33. Also, MIR 13 sends a control signal so that data is loaded from RAM 36 (arrow y8). As a result, data stored in a location in RAM 36 specified by address "abs16" is transferred to LDB 6 via data bus 34. Then, the data is transferred from LDB 6 to data register Dn of register group 19 through selector 25 (arrow y 9).

(c)-3

At time t9, an operation code of instruction "ADD Dm,Dn" is transferred from IB 1 to IR 2. The operation code is decoded by decoder 12. MIR 13 sends a control signal so that the data is transferred from data register Dn to ABUS 30 and B2BUS 32. Then, ALU 4 performs an operation using the data. The result is transferred to data register Dn of register group 19 via ABUS 30 (arrows y10 and y11).

Note that OAB 5 still holds "abs16" during time t9 through t11 since the memory is not accessed during that period.

(c)-4

At time t11, an operation code of instruction "ST Dn, (PA)" is transferred from IB 1 to IR 2. The operation code is decoded by decoder 12. At this time, the PA addressing bit of instruction "ST Dn,(PA)" is "1." On detecting the PA addressing bit of "1," decoder 12 directs MIR 13 to send a control signal so that a value is transferred from register Dn to a memory with the PA addressing.

At time t13, MIR 13 sends a control signal so that a value is transferred from register Dn of register group 19 to STB 7 via ABUS 30. Then, MIR 13 sends a control signal so that driver 9 transfers a value "abs16" from OAB 5 to address bus 33 (arrow y12), but that an address computation is not performed. MIR 13 sends a control signal so that data is stored in RAM 36. As a result, a value stored in STB 7 is stored in a location in RAM 36 specified by an address stored in OAB 5, namely "abs16".

In this way, the previous target memory address is used in the PA addressing method.

(d) Interrupt

The above description in (c) are based on the assumption that the values stored in OAB 5 are not destroyed. In reality, however, the values may be destroyed by interrupts. The present Embodiment prepares a countermeasure against such a case, namely a saving path as shown in FIG. 18.

Figure 18:
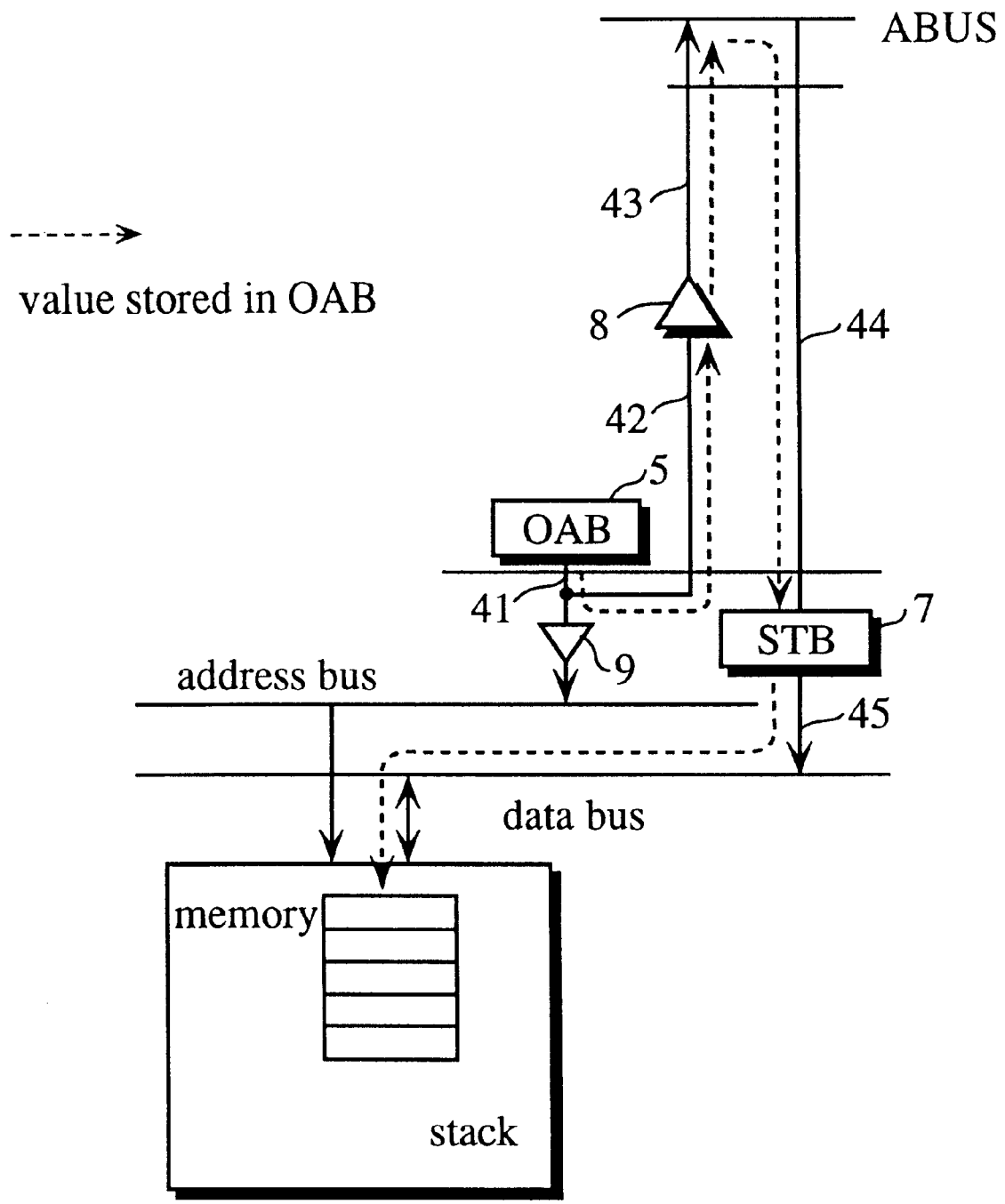
FIG. 18 is an enlarged part of FIG. 12, an area including OAB 5.

FIG. 18 is an enlarged part of FIG. 12, an area including OAB 5. As indicated by a broken line in the figure, paths 41, 42, 43, and 44 and ABUS 30 make up the saving path used for saving a value in OAB 5 into a memory. When driver 8 is activated, the value is saved into a stack in a memory through the saving path.

Figure 19A:
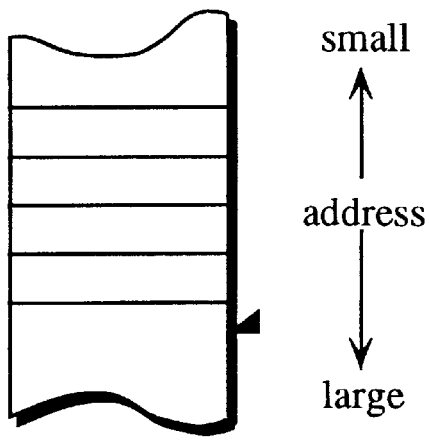
FIG. 19A shows the stack before an interrupt is processed.
Figure 19B:
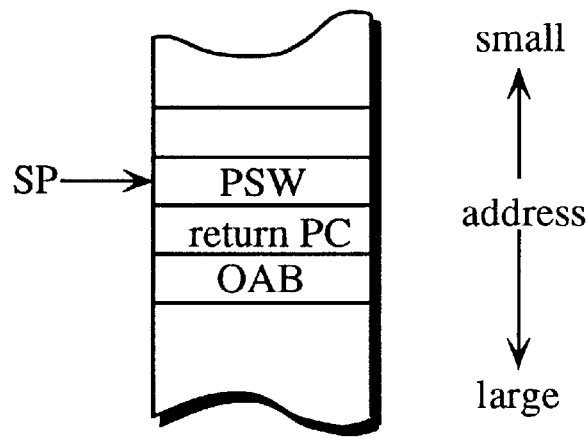
FIG. 19B shows the stack during the interrupt processing.

Now, how a value stored in OAB 5 is saved by decoder 12 and MIR 13 into the stack through the saving path is described with reference to FIG. 19. FIG. 19A shows the stack before an interrupt is processed. FIG. 19B shows the stack during the interrupt processing.

(d)-1: NMI interrupt

When interrupt receiving unit 21 receives an NMI interrupt, decoder 12 directs MIR 13 to send a control signal so that a stack pointer in register group 19 is updated (SP-6→SP). After the update, decoder 12 directs MIR 13 to send a control signal so that driver 8 sets the saving path. Then, a value stored in OAB 5 is transferred to a location in the stack specified by the stack pointer through the saving path (OAB 5→(SP+4)). A value stored in EXPC 18 is transferred to the stack (EXPC→(SP+2)), followed by a value stored in PSW 20 (PSW→(SP)).

FIG. 19B shows the stack after data has been saved through the above three stages.

As data has been saved to process the interrupt, the start address of the NMI interrupt is stored in IAB 10 and PFC 15.

Now, how the saved data is restored is described.

First, the value stored in the first location of the stack is transferred to PSW 20 ((SP)→PSW). Then, the value stored in the second location is transferred to program counter 18 ((SP+2)→EXPC). Finally, the value stored in the third location is transferred to OAB 5 via ABUS 30 and ALU 4 ((SP+4)→OAB 5).

(d)-2: IRQn interrupt

An IRQn interrupt is processed almost the same as an NMI interrupt except that (1) an interrupt level is written in the IMSK field of PSW 20, and that (2) an interrupt target address is obtained based on level n of IRQn.

As apparent from the above description, the microprocessor of Second Embodiment with PA addressing accesses a memory without absolute addressing, and can read/write data from/into a memory without using address registers. Also, even if there are lots of I/O accesses to I/O ports in memory mapped I/O, the address registers are not occupied. As a result, the microprocessor of Second Embodiment uses address registers efficiently.

Third Embodiment

Third Embodiment relates to a microprocessor which comprises a plurality of operand address buffers (OABs). A block including such OABs is called an OAB array.

Figure 20:
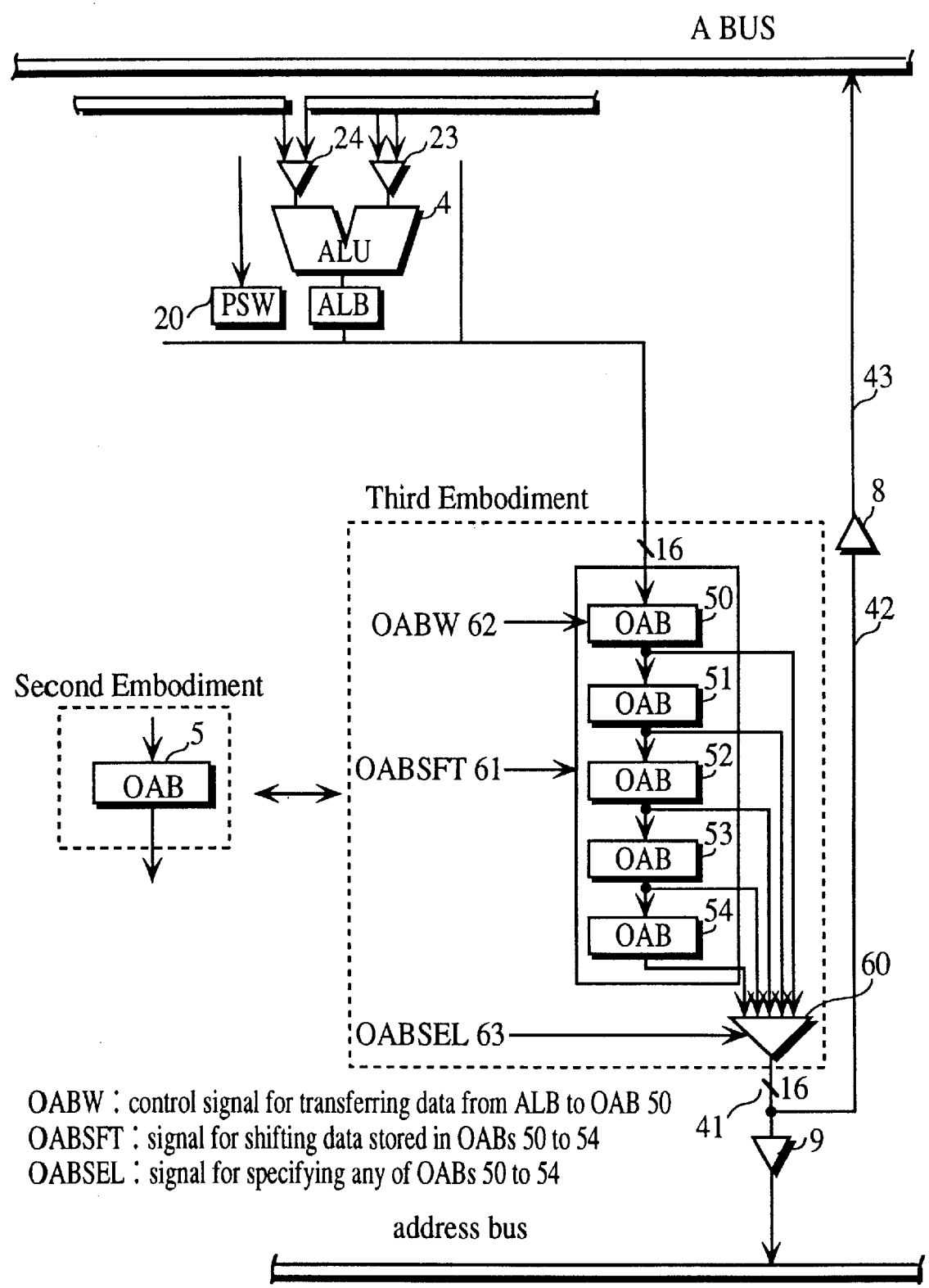
FIG. 20 shows an OAB array of Third Embodiment.

FIG. 20 shows the OAB array of Third Embodiment. The OAB array comprises OABs 50 to 54 and input selector 60. OAB 50 of FIG. 20 is constructed the same as OAB 5, and is followed by four buffers (OAB 51 to 54) also constructed the same as OAB 5. The five buffers respectively store the previous target memory address to the address five times previously.

Input selector 60 selectively outputs one of values stored in OABs 50 to 54 according to received OABSEL signal 63.

OABSFT signal 61 is a control signal for shifting data stored in the OAB array. When the control signal is output, the values stored in OABs 50 to 54 are shifted to the next OABs downward. Then, a value stored in the last OAB 54 is discarded. OABSFT signal 61 is output by MIR 13 when decoder 12 decodes a LOAD instruction or a STORE instruction. Accordingly, data stored in the OAB array is shifted each time decoder 12 decodes a LOAD instruction or a STORE instruction.

An OABW signal 62 is a control signal for transferring data from ALU 4 to OAB 50. OAB 50 holds a target memory address output from ALU 4 each time it receives OABW signal 62 after the previous data is shifted to OAB 51 by the output of OABSFT signal 61.

OABSEL signal 63 contains information for specifying any of OABs 50 to 54. Selector 60 outputs a value from specified OAB.

Figures 21A, 21B:
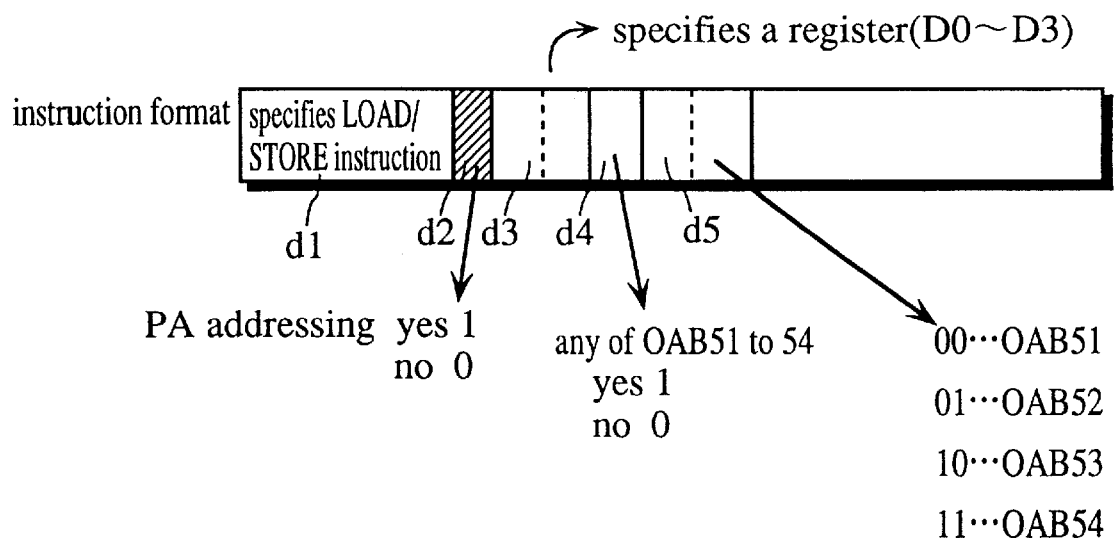
FIG. 21A shows the format of an instruction used in PA addressing.
FIG. 21B shows mnemonic representations of LOAD instructions used in PA addressing.

In Third Embodiment, an operation code is used to specify an OAB in the OAB array. Now, PA addressing of Third Embodiment is described with reference to FIGS. 21A and 21B. FIG. 21A shows the format of the instruction used in PA addressing. FIG. 21B shows mnemonic representations of STORE instructions used in PA addressing.

As shown in FIG. 21A, the instruction for PA addressing includes field d1 for indicating an instruction type (LOAD instruction, STORE instruction, etc.), field d2 (1 bit) for specifying the PA addressing for machine-language codes, field d3 of two bits for specifying a data register among D0 to D3 in register group 19, field d4 (1 bit) for specifying either OAB 50 or any of OABs 51 to 54 by "0" and "1", and field 5 (2 bits) for specifying any of OABs 51 to 54.

Field d4 specifies OAB 50 by "0", and any of OABs 51 to 54 by "1".

Field d5 specifies OAB 51 by "00", OAB 52 by "01", OAB 53 by "10", and OAB 54 by "11".

As shown in FIG. 21B, in mnemonic representation, "(PA)" specifies PA addressing, and "(PA1)" specifies PA addressing and also indicates that a value stored in OAB 51 is used as a target memory address. Similarly, "(PA2)" relates to OAB 52, "(PA3)" OAB 53, and "(PA4)" OAB 54.

Figure 22:
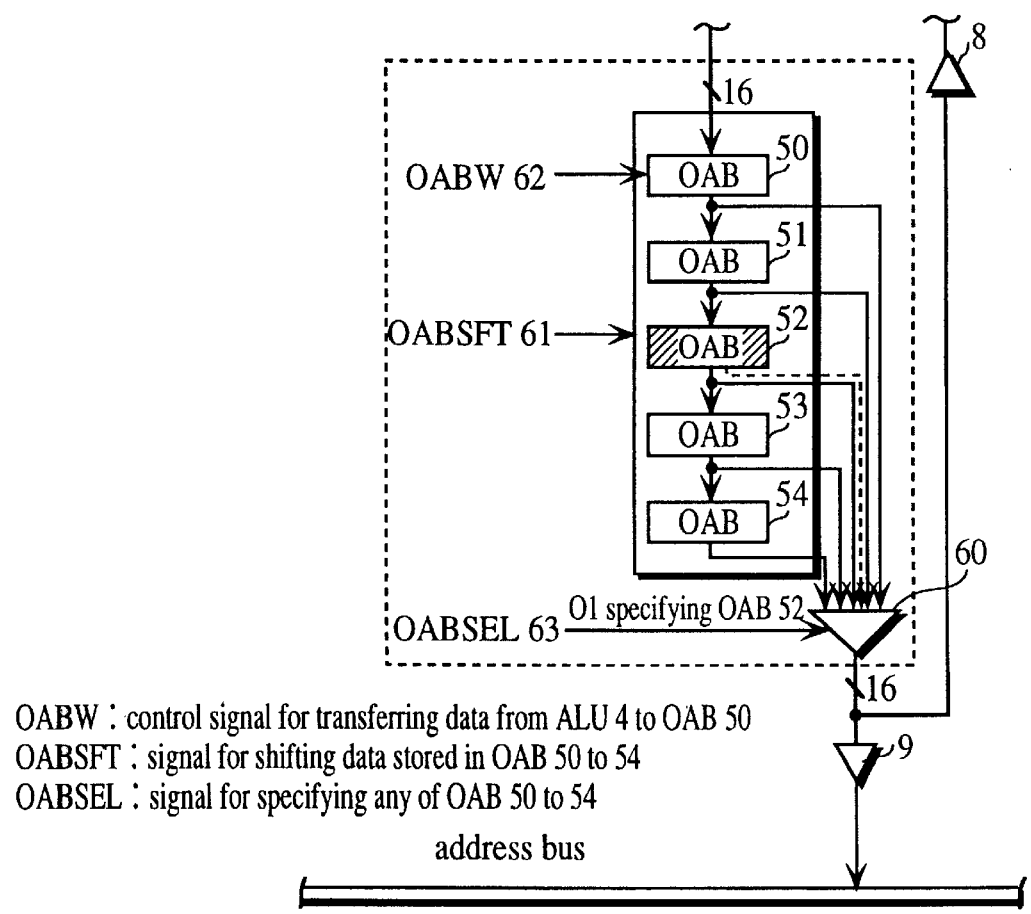
FIG. 22 shows a program using PA addressing which specifies OAB 52 in the OAB array, and how the OAB array operates by the program.

FIG. 22 shows a program using PA addressing which specifies an OAB of the OAB array, and how the OAB array operates by the program.

(1) Instruction "LD (adr1),D0"

IB 1 stores "LD (adr1),D0." An operation code of "LD (adr1),D0" is transferred from IB 1 to IR 2, and further to decoder 12. Decoder 12 decodes the operation code. Since the operation code indicates a LOAD instruction, decoder 12 directs MIR 13 to output OABSFT signal 61. On receiving OABSFT signal 61, the OAB array shifts the data, and MIR 13 outputs"adr1" to OAB 50. Address "adr1," a source operand of instruction "LD (adr1),D0" is transferred to OAB 50 via ALU 4. MIR 13 outputs OABSEL signal 63, and address "adr1" is output to address bus 33. Then, loading data from RAM 36 is allowed. A value stored in address "adr1" is loaded from RAM 36 onto LDB 6 via data bus 34. The value is then stored in data register Dn in register group 19.

(2) Instruction "ST D0,(adr2)"

IB 1 stores "ST D0,(adr2)." An operation code of "ST D0,(adr2)" is transferred from IB 1 to IR 2, and further to decoder 12. Decoder 12 decodes the operation code. Since the operation code indicates a STORE instruction, decoder 12 directs MIR 13 to output OABSFT signal 61. On receiving OABSFT signal 61, the OAB array shifts the data, and address "adr1" is shifted from OAB 50 to OAB 51. Address "adr2", a destination operand of instruction "ST D0,(adr2)," is transferred to OAB 50 via ALU 4. Since the operation code of the instruction does not specify PA addressing, "adr2" is output from OAB 50 to address bus 33 by OABSEL signal 63. Since this is a STORE instruction, a value stored in data register Dn in register group 19 is transferred to STB 7 through B2BUS 32. After the value is stored in STB 7, MIR 13 sends a control signal to RAM 36 so that storing data into RAM 36 is allowed. Then, the value is transferred from STB 7 to a location in RAM 36 specified by address "adr2."

(3) Instruction "LD (adr3),D0"

IB 1 stores "LD (adr3),D0." An operation code of "LD (adr3),D0" is transferred from IB 1 to IR 2, and further to decoder 12. Decoder 12 decodes the operation code. Since the operation code indicates a LOAD instruction, decoder 12 directs MIR 13 to output OABSFT signal 61.

On receiving OABSFT signal 61, the OAB array shifts the data. Address "adr1" is shifted from OAB 51 to OAB 52, and address "adr2" from OAB 50 to OAB 51. Address "adr3," a source operand of instruction "LD (adr3),D0" is transferred to OAB 50 via ALU 4. Since the operation code of the instruction does not specify PA addressing, "adr3" is output from OAB 50 to address bus 33 by OABSEL signal 63. MIR 13 sends a control signal so that loading data from RAM 36 is allowed. Then, a value stored in a location in RAM 36 specified by address "adr3" is loaded to LDB 6 through data bus 34. The value is stored in data register Dn in register group 19.

(4) Instruction "ADD D0,D1"

IB 1 stores "ADD D0,D1" An operation code of "ADD D0,D1" is transferred from IB 1 to IR 2, and further to decoder 12. Decoder 12 decodes the operation code. Since the operation code indicates an ADD operation, decoder 12 does not direct MIR 13 to output OABSFT signal 61.

Decoder 12 directs ALU 4 to perform an operation using a value stored in registers D0 and D1, that is, "adr1" and "adr3." Since register D1 is specified as a destination in instruction "ADD D0,D1," decoder 12 stores the operation result in register D1.

(5) Instruction "ST D1,(PA2)"

An operation code of "ST D1,(PA2)" is stored in IR 2. Decoder 12 decodes the operation code. Since the operation code specifies PA addressing, and OAB 52. Decoder 12 sends OABSEL signal 63 to input selector 60 so that an output destination is changed from OAB 50 to OAB 52. Since this is a STORE instruction, a value is transferred from data register D1 in register group 19 to STB 7 through B2BUS 32. After the value is stored in STB 7, MIR 13 sends a control signal to RAM 36 so that storing data into RAM 36 is allowed. Then, the value is transferred from STB 7 to a location in RAM 36 specified by address "adr2," which is stored in OAB 52 (a shaded box in FIG. 22), as indicated by a broken-line arrow.

(6) Interrupt

Figure 23A:
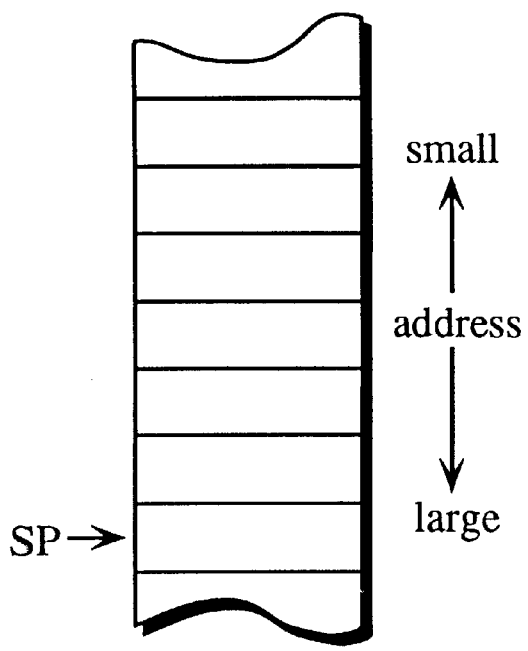
FIG. 23A shows the stack before an interrupt is processed in Third Embodiment.
Figure 23B:
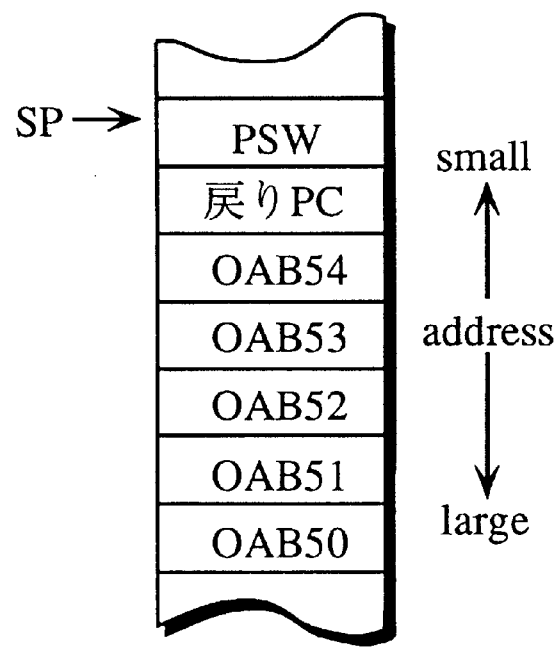
FIG. 23B shows the stack during the interrupt processing in Third Embodiment.

The same as Second Embodiment, data stored in OABs 50 to 54 should be saved when an interrupt occurs. How data is saved is described below with reference to FIG. 23. FIG. 23A shows the stack before an interrupt is processed in Third Embodiment. FIG. 23B shows the stack during the interrupt processing in Third Embodiment.

When interrupt receiving unit 21 receives an NMI interrupt, decoder 12 updates a stack pointer (SP-14→SP).

After the update, decoder 12 activates driver 8 to set the saving path for OAB 50. Decoder 12 sends OABSEL signal 63 specifying OAB 50 to input selector 60 so that a value stored in OAB 50 is output. The value is transferred to STB 7 through ABUS 30, and then to the stack.

After data is output from OAB 50, decoder 12 sends OABSFT signal 61 specifying OAB 51 to input selector 60 so that a value stored in OAB 51 is output. The value is similarly transferred to the stack through the saving path of driver 9-ABUS 30-STB 7. Then, decoder 12 sends control signals specifying OABs 52, 53, and 54 to input selector 60 in sequence so that values stored in the OABs are transferred to the stack.

After data stored in the OAB array is saved, data stored in EXPC 18 is saved (EXPC→(SP+2)), data stored in PSW 20 is saved (PSW→(SP)), and control moves to an interrupt target address. The content of the stack as shown in FIG. 23A changes to that as shown in FIG. 23B after the above processes complete. An IRQn interrupt is processed almost the same as an NMI interrupt except that (1) an interrupt level is written in the IMSK field of PSW 20, and that (2) an interrupt target address is obtained based on level n of IRQn.

The saved data is restored by processing the above steps backward.

As apparent from the above description, the microprocessor of Third Embodiment uses previous memory accesses selectively and decreases the ratio of address register occupation and the code size.

(7) Third Embodiment Application

Figure 24:
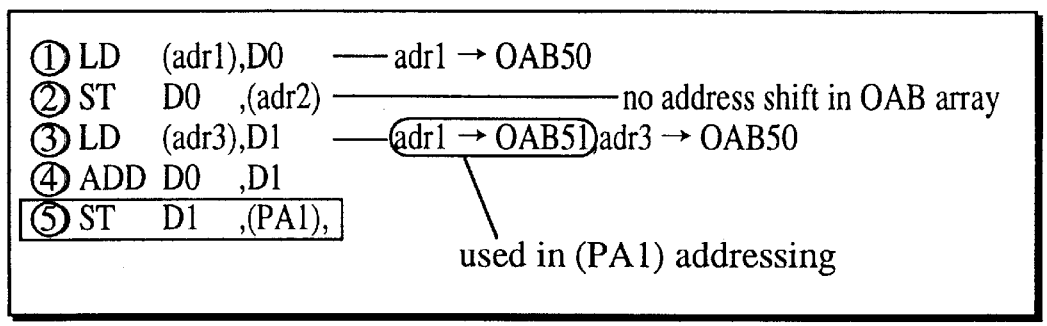
FIG. 24 shows an application of Third Embodiment.
Figure 24:
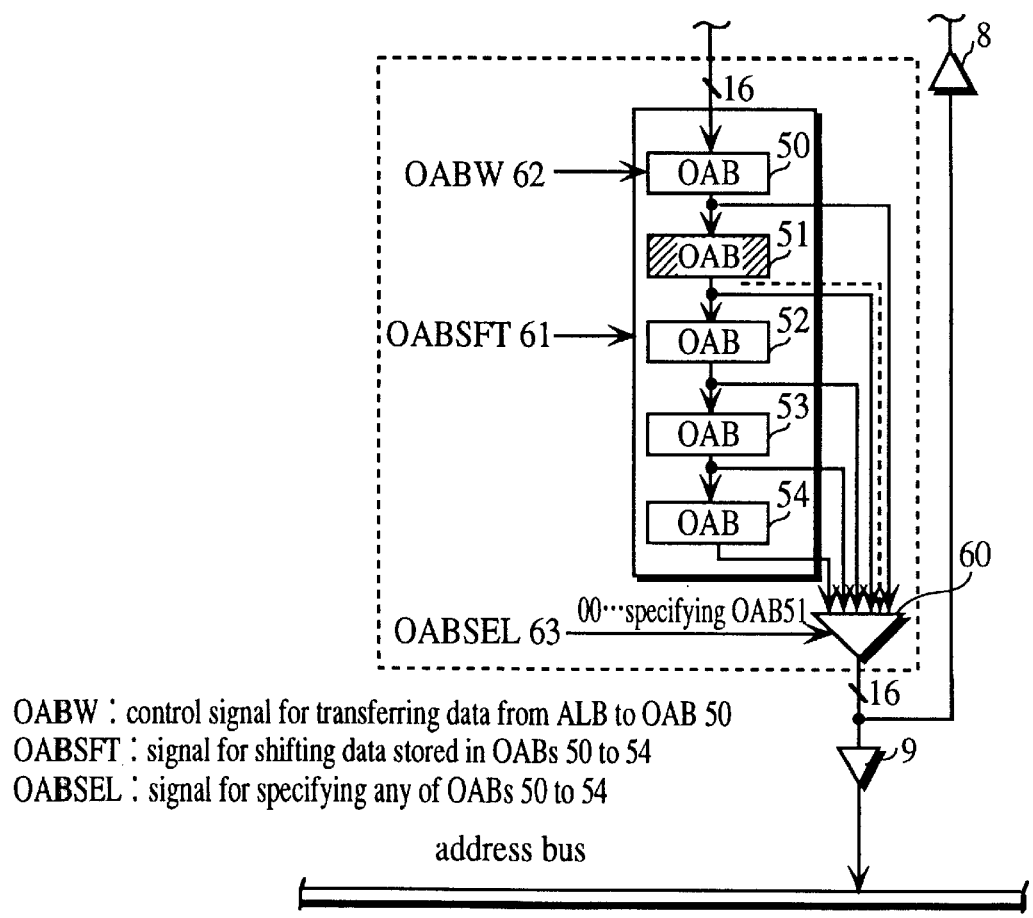

In Third Embodiment, data stored in the OAB array is shifted each time a LOAD instruction or a STORE instruction is executed. However, this arrangement may not be necessary for the execution of the STORE instruction since it is rare to store data into a same location repeatedly. Described below is an application of Third Embodiment for such a case with reference to FIG. 24.

In the above example in Third Embodiment, address "adr1" is shifted from OAB 50 to OAB 51 when instruction "ST D0,(adr2)" is executed. However, OABSEL signal 63 is not output when instruction "ST D0,(adr2)" is decoded. Therefore, OAB 50 keeps to hold address "adr1" after instruction "ST D0,(adr2)" is executed. Address "adr1" is shifted from OAB 50 to OAB 51 when instruction "LD (adr3),D1" is executed. Then, OAB 50 holds address "adr3."

An operation code of instruction "ST D1, (PA1)" is stored after instruction "ADD D0,D1" is executed. Since the operation code specifies PA addressing, decoder 12 sends OABSEL signal 63 to input selector 60 so that data output target is switched from OAB 50 to OAB 51. Since OAB 51 stores address "adr1,"0 address "adr1" is output to address bus 33. MIR 13 sends a control signal so that loading data from RAM 36 is allowed. As a result, a value stored in a location in RAM 36 specified by the address stored in OAB 51 is loaded into LDB 6 through data bus 34. Then, the data is transferred to data register Dn in register group 19.

Applications of this invention are possible in various forms as far as the inherent features are maintained. For example, an instruction may specify a relative address to a value stored in an OAB.

Also, an operand of an instruction of addition, subtraction, or shift operation may specify a value stored in an OAB.

OABs 50 to 54 connected in series in Third Embodiment may be connected in parallel. Also, the number of OABs in the OAB array may be increased to 9, 10, . . . , etc., or decreased to 2, 3 or 4 for example.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A microprocessor for supporting reduction of codes in size, comprising:

an operand address buffer for holding a target memory access address, wherein said operand address buffer is connected to an external memory, and said target memory access address has been used by said microprocessor in an immediately preceding access to said external memory;

fetching means for fetching an instruction;

an instruction detecting means for detecting an instruction which has been fetched by said fetching means and is to access said external memory;

a judging means for judging whether said instruction on detected by said instruction detecting means specifies said target memory access address stored in said operand address buffer;

a first controlling means for controlling said operand address buffer so that said address buffer is output to said external memory if said judging means judges that said instruction detected by said instruction detecting means specifies said target memory access address; and a second controlling means for storing an address obtained from an operand of said instruction on detected by instruction detecting means into said operand address buffer and controlling said operand address buffer so that said stored address is output to said external memory if said judging means judges that said instruction does not specify said target memory address stored in said operand address buffer.

2. The microprocessor of claim 1 further comprises:

an interrupt detecting means for detecting a start and an end of an interrupt processing;

a saving means for saving an address from said operand address buffer to a stack when said interrupt detecting means detects a start of an interrupt processing; and a restoring means for restoring said address from said stack to said operand address buffer when said interrupt detecting means detects an end of said interrupt processing.

3. A microprocessor for supporting reduction of codes in size, comprising:

a buffer array for including, for reuse, n operand address buffers which respectively store from an immediately preceding target memory access address to a target memory access n times previously used in past accesses to said external memory, wherein n is an integer of 2 or larger, and wherein buffer array is connected to an external memory;

a fetching means for fetching an instruction;

an instruction detecting means for detecting an instruction which has been fetched by said fetching means and is to access said external memory;

a judging means for judging whether said instruction detected by said instruction detecting means specifies any of said operand address buffers;

a first controlling means for controlling said buffer array so that said address buffer is output to said external memory if said judging means judges that said instruction detected by said instruction detecting means specifies said operand address buffer, and a second controlling means for storing an address obtained from an operand of said instruction detected by instruction detecting means into any of said operand address buffers and controlling said buffer array so that said stored address is output to said external memory if said judging means judges that said instruction does not specify any operand address buffers.

4. The microprocessor of claim 3, wherein said second controlling means comprises:

a first controlling means for controlling said buffer array so that each address stored in each operand address buffer is shifted to a next operand address buffer each time an instruction is detected by said instruction detecting means;

a second controlling means for controlling said buffer array so that an address obtained from an operand of an instruction fetched by said fetching means is stored in a first operand address buffer after said address shift by said first controlling means has completed; and a third controlling means for controlling said buffer array so that said address stored by said second controlling means is output to said external memory.

5. The microprocessor of claim 4 further comprises:

an interrupt detecting means for detecting a start and an end of an interrupt processing;

a saving means for saving said n addresses from said n operand address buffers to a stack when said interrupt detecting means detects a start of an interrupt processing; and a restoring means for restoring said n addresses from said stack to said n operand address buffers when said interrupt detecting means detects an end of said interrupt processing.

6. A microprocessor for supporting reduction of program codes in size, comprising:

a decoder for decoding instructions which are "W" in length represented by expression $$w = a + nb,$$

wherein "a" represents a length of code at each decoding by said decoder, "n" represents an integer of 0 or larger, and "b" represents a positive integer smaller than "a," wherein "b" represents a bit length called a half word when "a" represents a bit length called a word, wherein a half word is a half of a word in length, an instruction is divided into one or more codes, and wherein said instructions include at least an instruction which is "a" in length and an instruction which is "(a+b)" in length;

an executing means for processing data based on information obtained from said instructions decoded by said decoder;

an instruction buffer for holding a prefetched instruction;

a storage means for storing a state of said instruction held in said instruction buffer for each half word;

a first judging means for judging whether a code to be decoded next is a half word or a word in length based on information obtained from an instruction decoded by said decoder; and a controlling means for controlling said instruction buffer based on said length judged by said first judging means and said state stored in said storage means so that a code of said instruction stored in said instruction buffer is transferred to said decoder and for updating said state stored in said instruction buffer;

wherein said decoder comprises:

an upper-order decoding register for storing an upper-order half word of a code; and a lower-order decoding register for storing a lower-order half word of said code;

wherein said instruction buffer comprises:

a first register for storing a word code fetched latest; said first register comprising a first upper-order register for storing an upper-order half word of a code and a first lower-order register for storing a lower-order half word of said code;

a second register for storing a word code which precedes said code stored in said first register; said second register comprising a second upper-order register for storing an upper-order half word of a code and a second lower-order register for storing a lower-order half word of said code; and a selecting means for selectively transfering a code to said decoder based on a direction from said controlling means;

wherein said selecting means comprises:

an upper-order selecting means for selectively transferring a code to said upper-order decoding register from any of said second upper-order register, said second lower-order register, and said lower-order decoding register; and a lower-order selecting means for selectively transferring a code to said lower-order decoding register from any of said second upper-order register, said second lower-order register, and said first lower-order register;

wherein said storage means stores any of a first state which indicates that any of said second upper-order register and said second lower-order register does not store a code, a second state which indicates that said second upper-order register stores a code and said second lower-order register does not store a code, and a third state which indicates that each of said second upper-order register and said second lower-order register store a code.

7. The microprocessor of claim 6, wherein said controlling means controls said selecting means so that said upper-order selecting means transfer a code from said second upper-order register to said upper-order decoding register, and that said lower-order selecting means transfers a code from said first lower-order register to said lower-order decoding register, if said storage means stores said second state and said first judging means judges that a next code to be decoded is a word in length.

8. The microprocessor of claim 6, wherein said controlling means controls said selecting means so that said upper-order selecting means transfers a code from said second lower-order decoding register to said upper-order decoding register, and that said lower-order selecting means transfers a code from said second lower-order register to said lower-order decoding register, if said storage means stores said third state and said first judging means judges that a next code to be decoded is a half word in length, and updates said state stored in said storage means from said third state to said second state.

9. The microprocessor of claim 6, wherein said controlling means controls said selecting means so that said upper-order selecting means transfers a code from said lower-order decoding register to said upper-order decoding register, and that said lower-order selecting means transfers a code from said second upper-order register to said lower-order decoding register, if said storage means stores said second state and said first judging means judges that a next code to be decoded is a half word in length, and updates said state stored in said storage means from said second state to said third state.

* * * * *